(12) United States Patent
Huang

(10) Patent No.: US 9,898,144 B2
(45) Date of Patent: Feb. 20, 2018

(54) TOUCH CONTROL DISPLAY PANEL WITH TOUCH CONTROL DUAL-GATE THIN FILM TRANSISTORS AND TOUCH DISPLAY DEVICE

(71) Applicant: Shanghai Tianma Micro-Electronics Co., Ltd., Shanghai (CN)

(72) Inventor: Zhongshou Huang, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 240 days.

(21) Appl. No.: 14/102,018

(22) Filed: Dec. 10, 2013

(65) Prior Publication Data

US 2014/0176494 A1     Jun. 26, 2014

(30) Foreign Application Priority Data

Dec. 21, 2012  (CN) .......................... 2012 1 0560767

(51) Int. Cl.
  *G06F 3/045*   (2006.01)
  *G06F 3/044*   (2006.01)
  (Continued)

(52) U.S. Cl.
  CPC .......... *G06F 3/044* (2013.01); *G02F 1/13338* (2013.01); *G02F 1/13394* (2013.01); *G06F 3/0412* (2013.01); *G02F 2001/13398* (2013.01)

(58) Field of Classification Search
  CPC ...................................................... G06F 3/044
  (Continued)

(56) References Cited

U.S. PATENT DOCUMENTS 8,803,826 B2 *  8/2014  Pak .................... G06F 3/0412
                                                  345/173
8,860,669 B2 * 10/2014  Kim .................... G06F 3/044
                                                  178/18.01

(Continued)

FOREIGN PATENT DOCUMENTS

| CN | 103246381 A | 8/2013 | |
| EP | 2056187 A2 | 10/2008 | |
| EP | 2056187 A2 * | 5/2009 | ........... G06F 3/0412 |

OTHER PUBLICATIONS

Office Action as issued in corresponding European Application No. 13198009.6, dated Aug. 6, 2015.

(Continued)

*Primary Examiner* — Kwang-Su Yang
(74) *Attorney, Agent, or Firm* — Alston & Bird LLP

(57) ABSTRACT

The invention discloses a touch control display panel and a touch control display apparatus, where the touch control display panel includes a TFT array substrate and a color film substrate arranged in opposition; the TFT array substrate includes a pixel array and a touch control dual-gate TFT array; and when there is a touch control occurring, an electrically conductive post at a press location approaches the touch control dual-gate TFT along with a press, and a channel current of the touch control dual-gate TFT can be modulated by a current generated by the electrically conductive post. There will be no interference with a display per se in operation of the touch control, and no adverse influence imposed on the arrangement of liquid crystals in the liquid crystal display panel. The process of preparing the pixel array can be compatible with that of the touch control dual-gate TFTs, greatly lowering cost.

25 Claims, 13 Drawing Sheets

(51) Int. Cl.
*G02F 1/1333* (2006.01)
*G02F 1/1339* (2006.01)
*G06F 3/041* (2006.01)

(58) Field of Classification Search
USPC .......................................................... 345/174
See application file for complete search history.

(56) References Cited

U.S. PATENT DOCUMENTS

| | | | | |
|---|---|---|---|---|
| 8,976,132 | B2* | 3/2015 | Chou | ................... G06F 3/0412 345/173 |
| 2009/0115741 | A1 | 5/2009 | Wang et al. | |
| 2010/0103121 | A1 | 4/2010 | Kim et al. | |
| 2011/0001723 | A1* | 1/2011 | Fan | ....................... G06F 3/0412 345/174 |
| 2011/0074712 | A1 | 3/2011 | Bak et al. | |
| 2011/0316809 | A1* | 12/2011 | Kim | ....................... G06F 3/0412 345/174 |
| 2012/0162089 | A1* | 6/2012 | Chang | ................... G06F 3/0412 345/173 |
| 2013/0088460 | A1* | 4/2013 | Ahn | ....................... G06F 3/042 345/175 |
| 2014/0042438 | A1* | 2/2014 | Yamazaki | ......... H01L 29/78693 257/43 |

OTHER PUBLICATIONS

Extended Search Report as issued in corresponding European Application No. 13198009.6, dated Apr. 8, 2014.

* cited by examiner

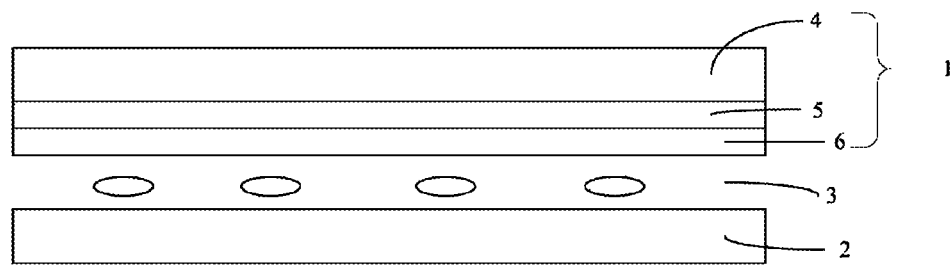
FIG. 1 (PRIOT ART)
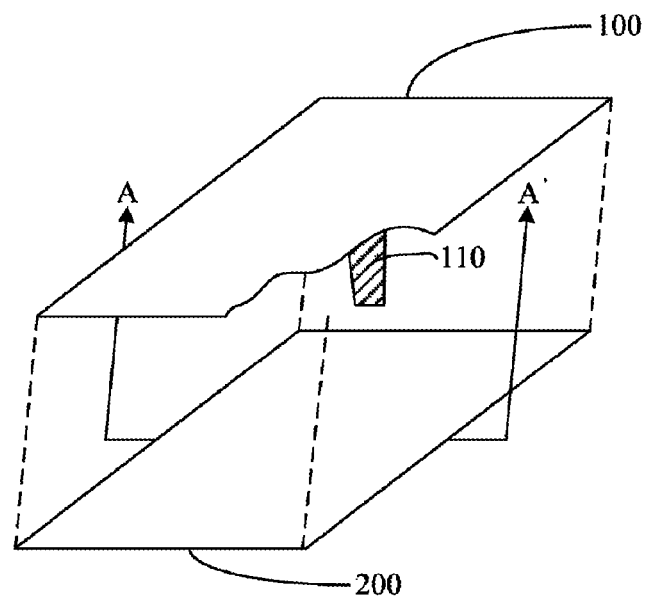
FIG. 2

TOUCH CONTROL DISPLAY PANEL WITH TOUCH CONTROL DUAL-GATE THIN FILM TRANSISTORS AND TOUCH DISPLAY DEVICE

CROSS-REFERENCES TO RELATED APPLICATIONS

This application claims the benefit of priority to Chinese Patent Application No. 201210560767.0, filed with the Chinese Patent Office on Dec. 21, 2012, the content of which is incorporated herein by reference in its entirety.

TECHNICAL FIELD

The present invention relates to the field of touch control displays and particularly to a touch control display panel and a touch display device.

BACKGROUND OF THE INVENTION

Display panels with a touch control function (simply referred to as a touch control display panel) gain increasing interest to various major manufacturers along with the rapid development of mobile communication devices, particularly the development of smart phones in recent years. At present the touch control display panels can be roughly divided into plug-in and inbuilt ones in terms of their different integrations of a touch control structure with a display structure. The inbuilt touch control display panel is lighter and thinner than the plug-in touch control display panel gains popularity among the manufacturers and consumers. At present the touch control structure in the inbuilt touch control display panel generally adopts a capacitive touch control structure or a resistive touch control structure. FIG. 1 is a schematic structural diagram of an inbuilt capacitive touch control liquid crystal display panel in the prior art. The inbuilt capacitive touch control liquid crystal display panel includes a color film substrate 1 and a Thin Film Transistor (TFT) array substrate 2 arranged in opposition, and a liquid crystal layer 3 arranged between the color film substrate 1 and the TFT array substrate 2. The color film substrate 1 includes an upper substrate 4, a capacitive touch control structure layer 5 and a color-resist layer 6. The inbuilt capacitive touch control display panel has the capacitive touch control structure layer integrated onto the color film substrate of the liquid crystal display panel to thereby have a display with inbuilt touch control. For either the inbuilt capacitive touch control display panel or the inbuilt resistive touch control display panel, the capacitive touch control structure or the resistive touch control structure has to be further prepared in addition to a display structure at a relatively high cost and in a relatively complex process. Also some technology has the capacitive touch control structure layer integrated into the TFT array substrate of the liquid crystal display panel to thereby manufacture the capacitive touch control structure concurrently with the TFT array at a lowered cost and in a simplified process. However the capacitive touch control structure in operation might influence the arrangement of liquid crystals and consequently hinder a display by the liquid crystals.

BRIEF SUMMARY OF THE INVENTION

Embodiments of the invention are intended to address such a technical problem in the prior art that the capacitive touch control structure integrated in the TFT array might influence the arrangement of liquid crystals and consequently hinder the display by the liquid crystals.

Embodiments of the invention are intended to address such another technical problem that the majority of existing inbuilt touch control display panels require a touch control structure to be prepared in addition to a display structure at a relatively high cost and in a relatively complex process.

In order to address the foregoing technical problems, an embodiment of the invention provides a touch control display panel including a TFT array substrate and a color film substrate arranged in opposition, wherein:

the TFT array substrate includes: a plurality of touch control drive lines; a plurality of touch control sense lines; and a plurality of touch control gate lines, a plurality of touch control dual-gate TFTs, ones of top gates and bottom gates of the touch control dual-gate TFTs being electrically connected with the touch control gate lines, ones of sources and drains of the touch control dual-gate TFTs being electrically connected with the touch control drive lines, and the others of the source and the drains of the touch control dual-gate TFTs being electrically connected with the touch control sense lines; and the color film substrate includes: a plurality of electrically conductive posts arranged on a surface of the color film substrate facing the TFT array substrate, the electrically conductive posts being arranged in opposition to the touch control dual-gate TFTs to modulate currents of the touch control dual-gate TFTs.

In a preferred implementation, the TFT array substrate further includes a pixel array including: a plurality of scan lines; a plurality of data lines intersecting with but insulated from the plurality of scan lines; and a plurality of pixel elements, each of which is arranged in a pixel area surrounded by adjacent scan lines and adjacent data lines. Furthermore the data lines are located at the same layer and of the same material and extend in the same direction as the touch control drive lines and the touch control sense lines.

In another preferred implementation, the TFT array substrate further includes a pixel array sharing the plurality of touch control gate lines as scan lines; and the pixel array further includes: a plurality of data lines intersecting with but insulated from the plurality of scan lines; and a plurality of pixel elements, each of which is arranged in a pixel area surrounded by adjacent scan lines and adjacent data lines. Furthermore the data lines are located at the same layer and of the same material and extend in the same direction as the touch control drive lines and the touch control sense lines.

In a third preferred implementation, the TFT array substrate further includes a pixel array sharing the plurality of touch control gate lines as scan lines and sharing the plurality of touch control drives lines as data lines; and the pixel array further includes a plurality of pixel elements, each of which is arranged in a pixel area surrounded by adjacent scan lines and adjacent data lines. Furthermore the data lines are located at the same layer and of the same material and extend in the same direction as the touch control sense lines.

For the foregoing touch control display panel, when there is no touch control occurring, free ends of the electrically conductive posts have no contact with the TFT array substrate; and when there is a touch control occurring, the electrically conductive posts approach the TFT array substrate along with a press and modulate the currents of the touch control dual-gate TFTs.

Preferably the bottom gates of the touch control dual-gate TFTs are electrically connected with the touch control gate lines; and when there is a touch control occurring, the electrically conductive posts are electrically connected with the top gates of the touch control dual-gate TFTs.

Preferably the bottom gates of the touch control dual-gate TFTs are electrically connected with the touch control gate lines; and when there is a touch control occurring, the free ends of the electrically conductive posts are sufficiently close to the top gates of the touch control dual-gate TFTs to thereby have the currents of the touch control dual-gate TFTs modulated by the electrically conductive posts.

Preferably the TFT array substrate further includes touch control electrodes thereon a surface layer thereof, which are electrically connected with the bottom gates of the touch control dual-gate TFTs; the top gates of the touch control dual-gate TFTs are electrically connected with the touch control gate lines; and when there is a touch control occurring, the electrically conductive posts are electrically connected with the touch control electrodes.

Preferably the TFT array substrate further includes touch control electrodes thereon a surface layer thereof, which are electrically connected with the bottom gates of the touch control dual-gate TFTs; the top gates of the touch control dual-gate TFTs are electrically connected with the touch control gate lines; and when there is a touch control occurring, the free ends of the electrically conductive posts are sufficiently close to the top gates of the touch control dual-gate TFTs to thereby have the currents of the touch control dual-gate TFTs modulated by the electrically conductive posts.

In the foregoing embodiment of the touch control display panel according to the invention, the structure of the color film substrate can be designed variously, for example:

The color film substrate further includes a first electrically conductive layer electrically connected with the plurality of electrically conductive posts, wherein the first electrically conductive layer can be of an integral structure; or the first electrically conductive layer can include a plurality of separate first conductive lines, each of which is electrically connected with at least one of the electrically conductive posts.

If the first electrically conductive layer is of an integral structure, then at least two of the touch control drive lines, the touch control sense lines and the touch control gate lines intersect with but are insulated from each other. Preferably the touch control sense lines and the touch control gate lines intersect with but are insulated from each other and determine coordinates of a touch control location.

If the first electrically conductive layer includes a plurality of separate first conductive lines, each of which is electrically connected with at least one of the electrically conductive posts, then at least two of the touch control drive lines, the touch control sense lines, the touch control gate lines and the first conductive lines intersect with but are insulated from each other. Preferably the touch control gate lines and the first conductive lines intersect with but are insulated from each other and determine coordinates of a touch control location.

The electrically conductive posts in the color film substrate can be structured variously.

Preferably the electrically conductive posts includes insulation post bodies and a second electrically conductive layer on the surface of the insulation post bodies; and the first electrically conductive layer and the second electrically conductive layer are connected and are located on the same layer and of the same material, wherein the first electrically conductive layer and the second electrically conductive layer can be of a transparent electrically conductive material. The first electrically conductive layer can alternatively be a grid-like metal layer; and at this time the color film substrate can further include a black matrix, and the grid-like first electrically conductive layer is shielded by the black matrix.

Preferably the electrically conductive posts are of an electrically conductive organ material, and the first electrically conductive layer is an electrically conductive black matrix. Then the color film substrate can further include an upper substrate and a color-resist layer, and the black matrix is located between the upper substrate and the color-resist layer; or the color film substrate further includes an upper substrate and a color-resist layer thereon, and the black matrix is located between the color-resist layer and the electrically conductive posts.

In a preferred implementation, in the respective embodiments of the touch control display panel according to the invention, the touch control display panel can further include primary posts; and when there is no touch control occurring, both ends of the primary posts come into contact respectively with the TFT array substrate and the color film substrate.

Preferably the length of the primary posts themselves is equal to that of the electrically conductive posts.

Preferably the primary posts includes first primary posts and second primary posts; and the first primary posts transmit an external drive signal from the TFT array substrate to the electrically conductive layer on the color film substrate.

Preferably the touch control display panel further includes frame sealing glue on the periphery of the touch control display panel to bond the color film substrate and the TFT array substrate together, and the first primary posts are located in the frame sealing glue or on a side of the frame sealing glue proximate to a liquid crystal layer or on a side of the frame sealing glue distant from the liquid crystal layer.

In the foregoing embodiments of the touch control display panel according to the invention, pixel elements include switch TFTs and pixel electrodes; gates of the switch TFTs are electrically connected with the scan lines; sources/drains of the switch TFTs are electrically connected with the data lines; and the drains/the sources of the switch TFTs are electrically connected with the pixel electrodes. Preferably at least a part of the touch control dual-gate TFTs are structurally identical to the switch TFTs, and the touch control dual-gate TFTs are compatible to the switch TFTs in terms of their preparation processes.

In the foregoing embodiment of the touch control display panel according to the invention, the touch control dual-gate TFTs can be distributed, for example, in such a way that one of the touch control dual-gate TFTs is arranged in each of the pixel areas; or one of the touch control dual-gate TFTs is arranged at an interval of a predetermined number of pixel areas of pixel elements.

The touch control display panel according to the invention can be a touch control liquid crystal display panel, and the touch control display panel can further include a liquid crystal arranged between the TFT array substrate and the color film substrate.

An embodiment of the invention further provides a touch control display device including the foregoing touch control display panel.

BRIEF DESCRIPTION OF THE DRAWINGS

FIG. 1 is a schematic structural diagram of an inbuilt capacitive touch control liquid crystal display panel in the prior art;

FIG. 2 is a schematic 3D view of a touch control display panel according to a first embodiment of the invention;

DETAILED DESCRIPTION OF THE PREFERRED EMBODIMENTS

Figure 3:
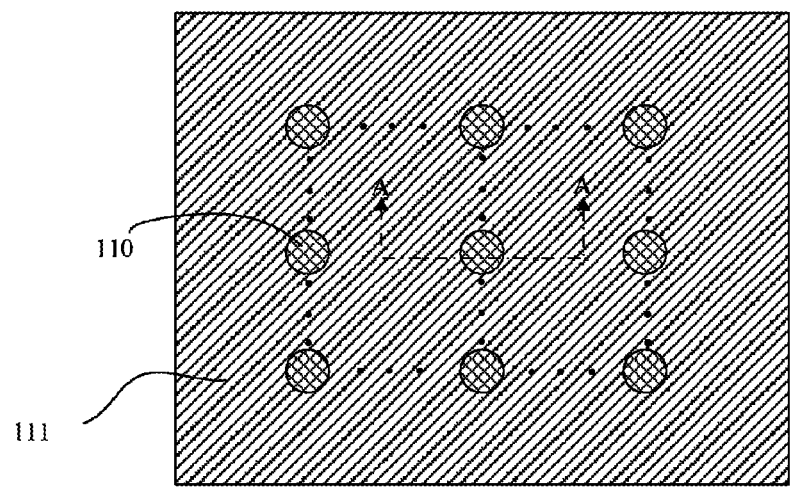
FIG. 3 is a schematic structural top view of a color film substrate according to the first embodiment of the invention.

Embodiments of the invention perform a touch control function using a touch control dual-gate TFT array compatible with a process of preparing a pixel array on a TFT array substrate without mutual interference between the touch control function and a display function which are performed. Specifically an embodiment of the invention provides a touch control display panel including: a TFT array substrate and a color film substrate arranged in opposition; and The TFT array substrate includes a pixel array and a touch control dual-gate TFT array, Where the touch control dual-gate TFT array includes: a plurality of touch control drive line; a plurality of touch control sense lines; a plurality of touch control gate lines; and a plurality of touch control dual-gate TFTs, top gates/bottom gates (i.e., ones of the top gates and the bottom gates) of the touch control dual-gate TFTs being electrically connected with the touch control gate lines, sources/drains (ones of the sources and the drains) of the touch control dual-gate TFTs being electrically connected with the touch control drive lines, and the drains/the sources (correspondingly the others of the sources and the drains) of the touch control dual-gate TFTs being electrically connected with the touch control sense lines; and The pixel array includes: a plurality of scan lines; a plurality of data lines intersecting with but insulated from the plurality of scan lines; and a plurality of pixel elements, each of which is arranged in a pixel area surrounded by adjacent scan lines and adjacent data lines. Typically the pixel elements include switch TFTs and pixel electrodes; and gates of the switch TFTs are electrically connected with the scan lines, sources/drains (ones of the sources and the drains) of the switch TFTs are electrically connected with the data lines, and the drains/the sources (correspondingly the others of the sources and the drains) of the switch TFTs are electrically connected with the pixel electrodes.

The color film substrate includes: a plurality of electrically conductive posts arranged on a surface of the color film substrate facing the TFT array substrate, the electrically conductive posts being arranged in corresponding to the touch control dual-gate TFTs to modulate currents of the touch control dual-gate TFTs.

Thus when there is no touch control occurring, free ends of the electrically conductive posts are sufficiently far away from the touch control dual-gate TFTs, and channel currents of the touch control dual-gate TFTs will not be modulated by electric fields of the electrically conductive posts; and when there is a touch control occurring, a finger or another object is pressed against the color film substrate, and an electrically conductive post at the location where the object is pressed approaches the touch control dual-gate TFT as the object is pressed, and when the electrically conductive post approaches sufficiently the gate of the touch control dual-gate TFT or approaches sufficiently the electrode electrically connected with the gate of the touch control dual-gate TFT, the electric field generated by the electrically conductive post can module the channel current of the touch control dual-gate TFT, and the modulated current can be detected to show that the touch control is occurring there. Of course, when there is the touch control occurring, the electrically conductive post at the location where the object is pressed approaches the touch control dual-gate TFT as the object is pressed, and the electrically conductive post can alternatively be electrically connected directly or indirectly with the gate of the touch control dual-gate TFT, and a potential of the electrically conductive post is transmitted to the gate of the touch control dual-gate TFT and further modulates the channel current of the gate of the touch control dual-gate TFT, and also the modulated current can be detected to show that the touch control is occurring there.

Since the touch control display panel according to the embodiment of the invention performs a touch control using the touch control dual-gate TFTs under a totally different touch control principle from those of the existing resistive touch control and capacitive touch control, there will no interference with a display per se in operation, and particularly no adverse influence will be imposed on the arrangement of liquid crystals in the liquid crystal display panel. Moreover at least a part of the touch control dual-gate TFTs are structurally identical to the switch TFTs in the pixel array, in other words, a process of preparing the pixel array can be compatible with that of the touch control dual-gate TFTs for a touch control, and parts and even all of them can be at the same layer and of the same material to thereby save the raw material, thus greatly lowering a cost.

In a preferred implementation, in the touch control display panel according to another embodiment of the invention, the touch control gate lines for a touch control and the scan lines for a display can be common; or the touch control gate lines for a touch control and the data lines for a display can be common; and even the touch control gate lines for a touch control and the scan lines for a display can be common, and also the touch control gate lines for a touch control and the data lines for a display can be common, so that the touch control structure with the display structure can be integrated at an improved level.

Alike a touch control display device according to an embodiment of the invention including the foregoing touch control display panel has corresponding advantages.

The touch control display panel and the touch control display device according to the embodiments of the invention, on one hand, are embodied under a new display principle and perform an inbuilt touch display with a relatively light and thin of the display panel; and on the other hand, will have neither additional structural component nor additional process step required in addition to the display panel to thereby make the structure and the process compatible and lower a cost; and on the third hand, the touch control dual-gate TFTs in operation will not influence a normal display by the display panel to thereby make both the touch control and the display compatible.

A First Embodiment of the Invention

FIG. 2 illustrates a structural 3D view of a touch control display panel according to the first embodiment of the invention. As can be apparent from FIG. 2, the touch control display panel according to the first embodiment includes a TFT array substrate 200 and a color film substrate 100 arranged in opposition. Typically the TFT array substrate 200 and the color film substrate 100 are arranged in parallel and bonded together by frame sealing glue coated between them in a peripheral area (not illustrated). For the display panel of a different type, the TFT array substrate 200 and the color film substrate 100 can have a vacuum between them or can have gas, liquid and even colloid filled between them. For example, if the touch control display panel is a touch control liquid crystal display panel, then the TFT array substrate 200 and the color film substrate 100 can have liquid crystal molecules filled between them; if the touch control display panel is a sheet of touch control electronic paper, then the TFT array substrate 200 and the color film substrate 100 can have electronic ink filled between them; if the touch control display panel is a plasma display panel, then the TFT array substrate 200 and the color film substrate 100 can have gas that can be ionized filled between them; and so on.

The TFT array substrate 200 in the touch control display panel according to the first embodiment of the invention includes a pixel array and a touch control dual-gate TFT array, and the pixel array and the touch control dual-gate TFT array are arranged separately from each other.

Where the touch control dual-gate TFT array includes: a plurality of touch control drive line; a plurality of touch control sense lines; a plurality of touch control gate lines; and a plurality of touch control dual-gate TFTs, top gates/bottom gates of the touch control dual-gate TFTs being electrically connected with the touch control gate lines, sources/drains of the touch control dual-gate TFTs being electrically connected with the touch control drive lines, and the drains/the sources of the touch control dual-gate TFTs being electrically connected with the touch control sense lines; and The pixel array includes: a plurality of scan lines; a plurality of data lines intersecting with but insulated from the plurality of scan lines; and a plurality of pixel elements, each of which is arranged in a pixel area surrounded by adjacent scan lines and adjacent data lines. Typically the pixel elements include switch TFTs and pixel electrodes; and gates of the switch TFTs are electrically connected with the scan lines, sources/drains of the switch TFTs are electrically connected with the data lines, and the drains/the sources of the switch TFTs are electrically connected with the pixel electrodes.

In addition to the traditional color film substrate, the color film substrate in the touch control display panel according to the first embodiment of the invention has a plurality of electrically conductive posts arranged in correspondence to the plurality of touch control dual-gate TFTs to module currents of the touch control dual-gate TFTs to thereby perform a touch control function.

FIG. 3 is a schematic structural top view of the color film substrate according to the first embodiment of the invention. As can be apparent from FIG. 3, the color film substrate 100 includes: a plurality of electrically conductive posts 110 arranged on a surface of the color film substrate 100 facing the TFT array substrate 200, and a first electrically conductive layer 111 connected with the plurality of electrically conductive posts 110. The first electrically conductive layer 111 is of an integral structure.

Figure 4:
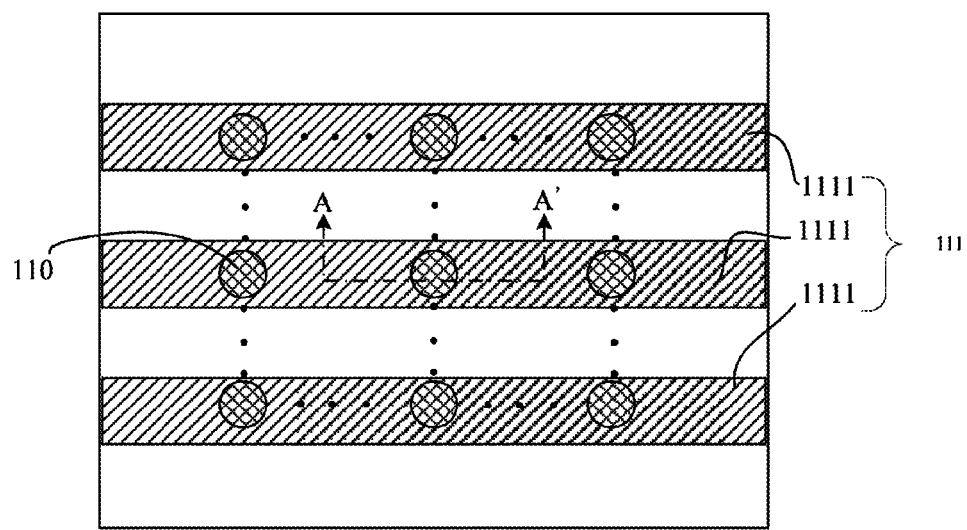
FIG. 4 is another schematic structural top view of the color film substrate according to the first embodiment of the invention.

However the first electrically conductive layer 111 may not be of an integral structure, and as illustrated in FIG. 4, the first electrically conductive layer 111 includes a plurality of first conductive lines 1111 separated from each other, and each first conductive line 1111 is electrically connected with at least a conductive line post 110. Typically the respective first conductive lines 1111 are arranged in parallel and extend in the same direction, and each first conductive line 1111 is connected with a row or column of electrically conductive posts 110.

For the color film substrate illustrated in FIG. 3, since the plurality of electrically conductive posts 110 thereon are electrically connected together by the integral electrically conductive layer 111, then in order to perform a touch control function, simply at least two ones of the touch control drive lines, the touch control sense lines and the touch control gate lines intersect with but are insulated from each other so that touch control coordinates can be determined by the least two ones intersecting with but insulated from each other. That is, all the three ones of the touch control drive lines, the touch control sense lines and the touch control gate lines intersect with but are insulated from each other; or two ones of the touch control drive lines, the touch control sense lines and the touch control gate lines intersect with but are insulated from each other, and the remaining ones extend in any direction (typically the same as the direction in which either of the two ones intersecting with but insulated from each other extend).

Figure 5:
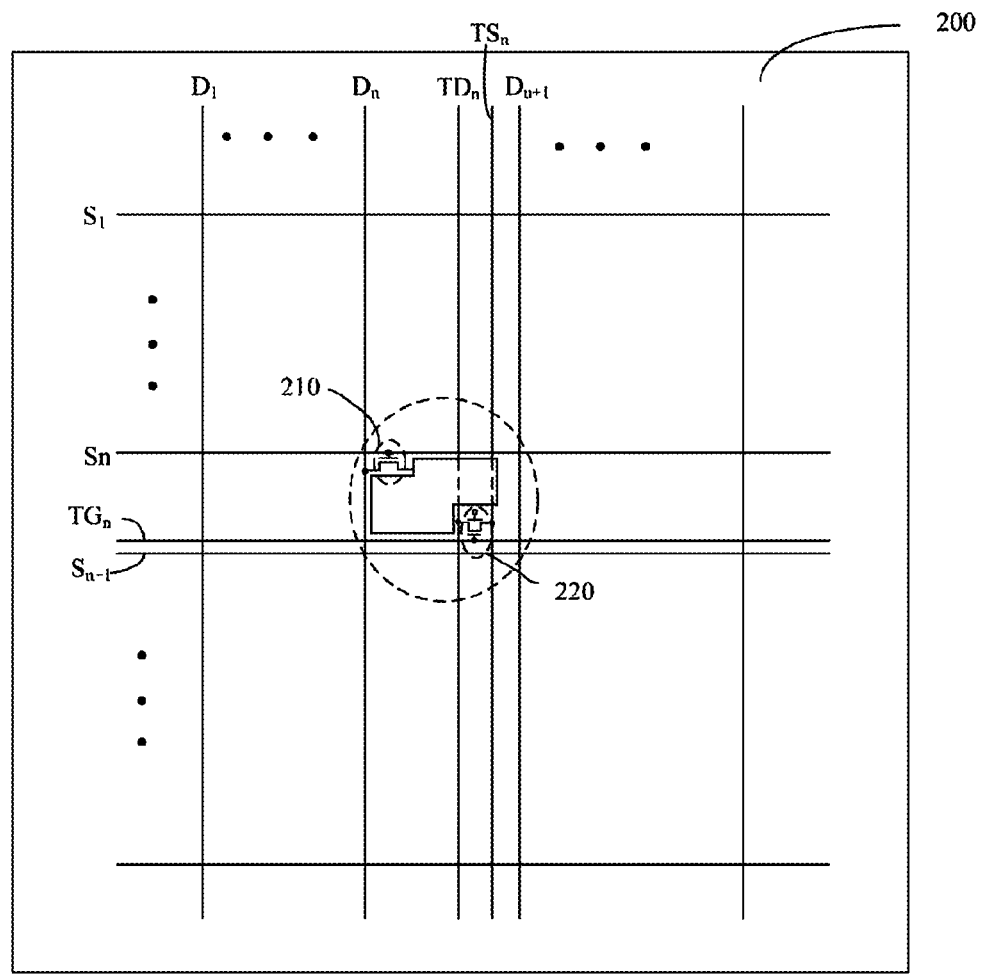
FIG. 5 is a schematic structural top view of a TFT array substrate according to the first embodiment of the invention.
Figure 6:
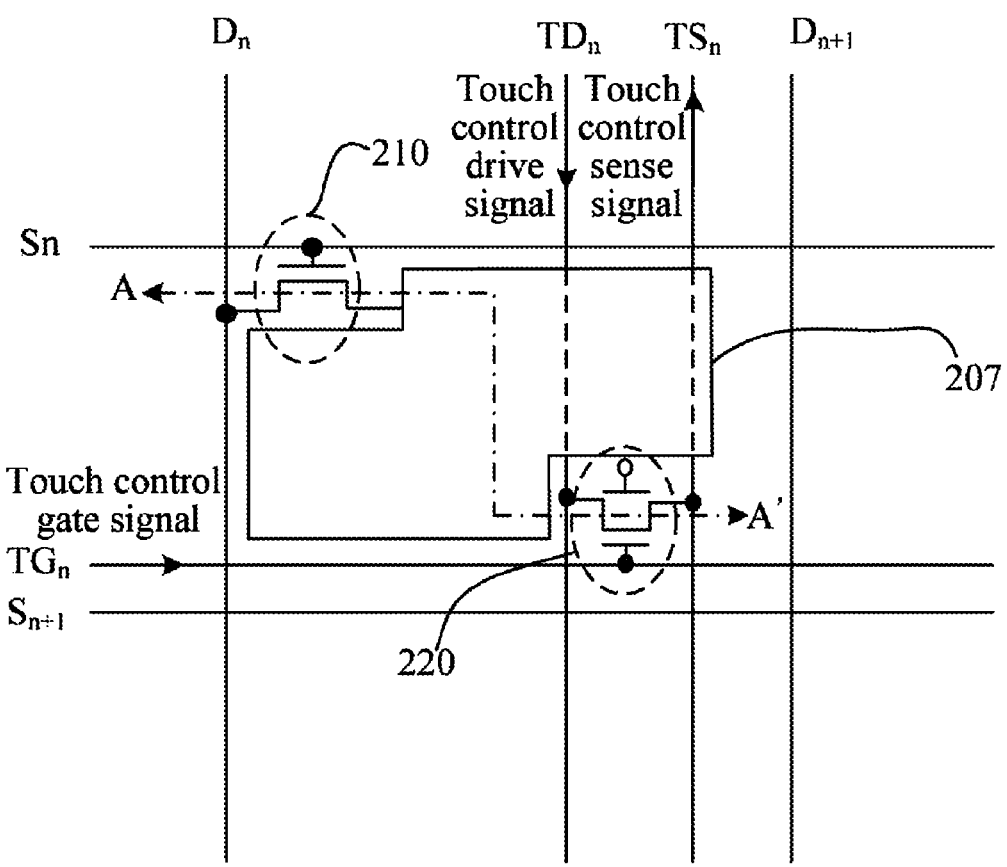
FIG. 6 is a magnified view of the dotted area in FIG. 5.

Specifically FIG. 5 is a schematic structural top view of the TFT array substrate in FIG. 2. FIG. 6 is a magnified view of the dotted area in FIG. 5. As can be apparent from FIG. 5 and FIG. 6, the TFT array substrate 200 includes:

A plurality of touch control drive lines TD (TD1, TD2, . . . , TDn, . . . ); a plurality of touch control sense lines TS (TS1, TS2, . . . , TSn, . . . ); a plurality of touch control gate lines TG (TG1, TG2, . . . , TGn, . . . ); and a plurality of touch control dual-gate TFT 220.

The top gates/bottom gates (i.e., ones of the top gates and the bottom gates) of the touch control dual-gate TFTs 220 are electrically connected with the touch control gate lines TG, sources/drains (ones of the sources and the drains) of the touch control dual-gate TFTs 220 are electrically connected with the touch control drive lines TD, and the drains/the sources (correspondingly the others of the sources and the drains) of the touch control dual-gate TFTs 220 being electrically connected with the touch control sense lines TS.

The TFT array substrate 200 further includes: a plurality of scan lines S (S1, . . . , Sn, Sn+1, . . . ); a plurality of data lines D (D1, . . . , Dn, Dn+1, . . . ) intersecting with but insulated from the plurality of scan lines S (S1, . . . , Sn, Sn+1, . . . ); and a plurality of pixel elements, each of which is arranged in a pixel area surrounded by adjacent scan lines S and adjacent data lines D. Each pixel element include a switch TFT 210 and a pixel electrode 207; and a gate of the switch TFT 210 is electrically connected with one of the scan lines S, a source/a drain of the switch TFT 210 is electrically connected with one of the data lines D, and the drain/the source of the switch TFT 210 are electrically connected with one of the pixel electrodes 207.

Where the touch control drive lines TD and the touch control sense lines TS extend in the same direction as the direction in which the data lines D extend; and the touch control gate lines TG intersect with but are insulated from both the touch control drive lines TD and the touch control sense lines TS. Thus the touch control display panel including the TFT array substrate illustrated in FIG. 5 and FIG. 6 can have touch control coordinates determined by the touch control gate lines TG and the touch control drive lines TD intersecting with but insulated from each other or have touch control coordinates determined by the touch control gate lines TG and the touch control sense lines TS intersecting with but insulated from each other.

Figure 7:
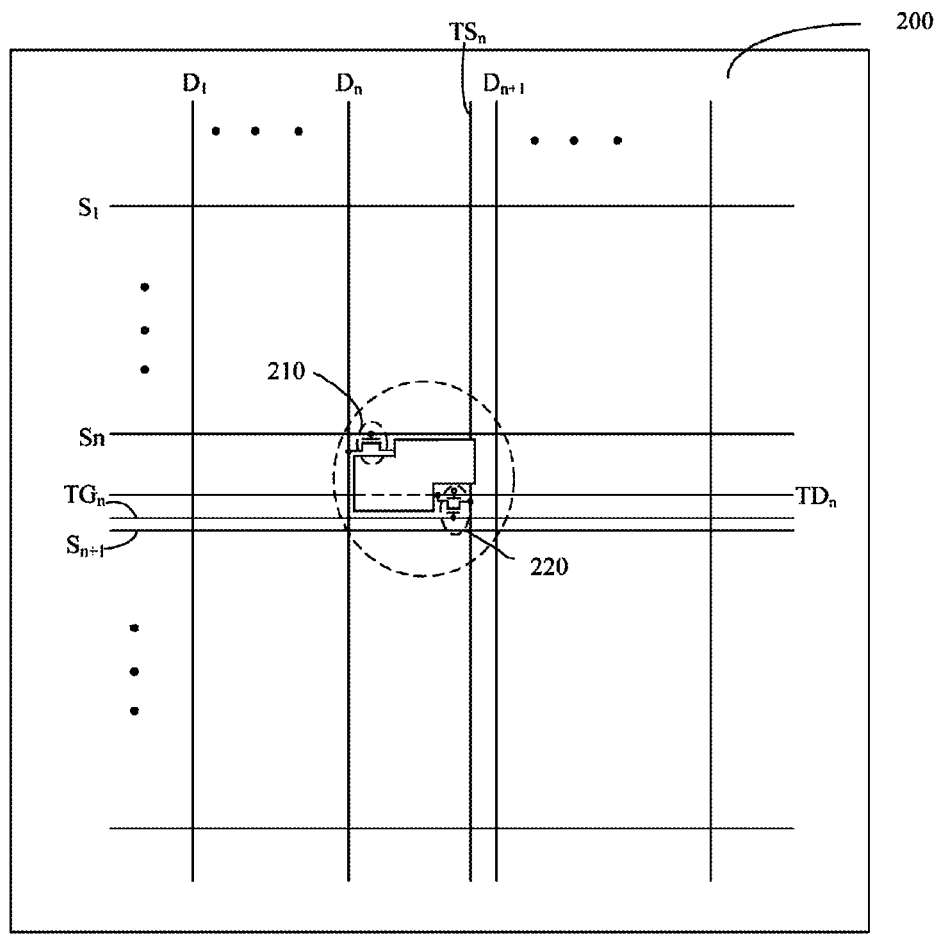
FIG. 7 is another schematic structural top view of a TFT array substrate according to the first embodiment of the invention.
Figure 8:
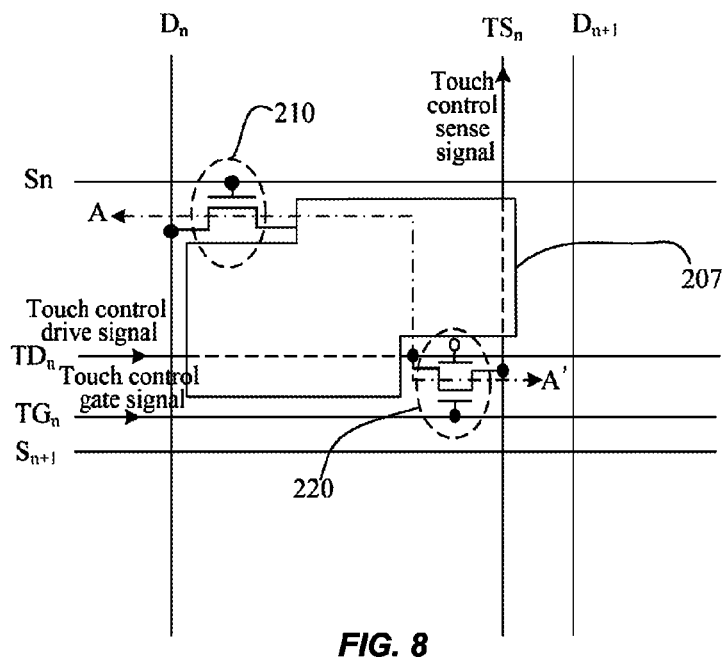
FIG. 8 is a magnification view of the dotted area in FIG. 7.

Of course the touch control display panel structured to have touch control coordinates determined by the touch control drive lines TD and the touch control sense lines TS intersecting with but insulated from each other can also be possible as illustrated in FIG. 7 and FIG. 8. FIG. 7 and FIG. 8 correspond respectively to FIG. 5 and FIG. 6, and a repeated description of their common components will be omitted here, and a difference between them lies in that in the TFT array substrate illustrated in FIG. 7 and FIG. 8, the touch control drive lines TD and the touch control sense lines TS intersect with but are insulated from each other; the touch control gate lines TG and the touch control drive lines TD are insulated from each other and extend in the same direction as the direction in which the lines S extend; and the touch control sense lines TS and the data lines D are insulated from each other and extend in the same direction.

Alternatively, it is possible that the touch control drive lines TD and the touch control sense lines TS intersect with but are insulated from each other; the touch control gate lines TG and the touch control sense lines TS are insulated from each other and extend in the same direction as the direction in which the lines S extend; and the touch control drive lines TD and the data lines D are insulated from each other and extend in the same direction (not illustrated).

Moreover the touch control dual-gate TFTs 220 in FIG. 5 can be distributed variously, for example, a touch control dual-gate TFT is arranged in each pixel area; or a touch control dual-gate TFT can be arranged at an interval of a predetermined number of pixel areas of pixel elements, and specifically a touch control dual-gate TFT can be arranged at an interval of M pixel areas of pixel elements in the direction parallel to the scan lines, and a touch control dual-gate TFT can be arranged at an interval of N pixel areas of pixel elements in the direction parallel to the data lines, where both M and N are positive integers.

Figure 9:
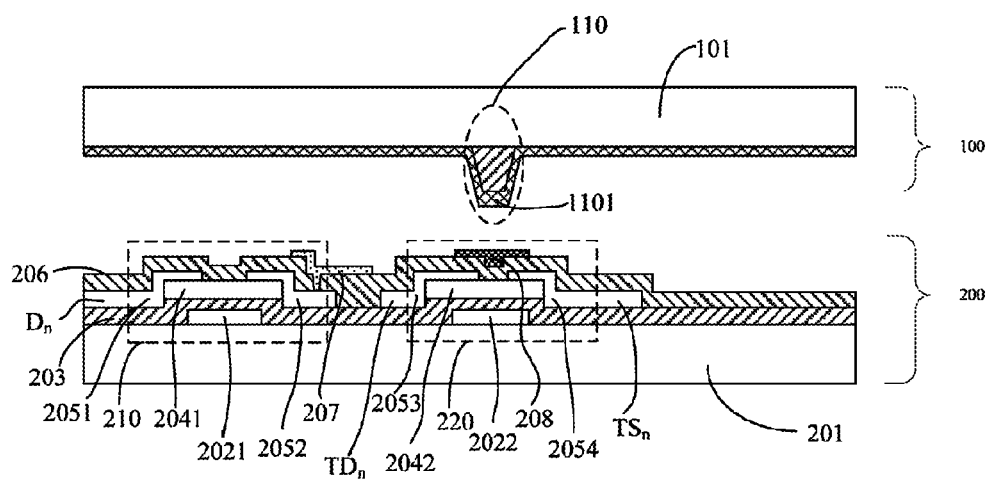
FIG. 9 is a schematic structural sectional view of the touch control display panel including the TFT array substrate illustrated in FIG. 5 along A-A'.

FIG. 9 is a schematic structural sectional view of the touch control display panel including the TFT array substrate illustrated in FIG. 6 along A-A'. As can be apparent from FIG. 3, FIG. 5, FIG. 6 and FIG. 9, the TFT array substrate 200 includes a lower substrate 201 and a pixel array on the lower substrate 201.

The switch TFT 210 in the pixel element is a bottom TFT including a first gate 2021 on the lower substrate 201, a first insulation layer (a gate insulation layer) 203 on the first gate 2021, a first active layer 2041 (possibly of an amorphous silicon material or another semiconductor material and possibly in one or more layers) on the first insulation layer 203, a first source 2051 and a first drain 2052 on the first active layer 2041, and a second insulation layer (a passivation layer) 206 above the first source 2051 and the first drain 2052, where the first source 2051 and the first drain 2052 are separate from each other and electrically connected respectively with the first active layer 2041; the first source 2051 and the first drain 2052 have a channel formed of the first active layer 2041 between them, and the first gate 2021 is located below the channel; and the pixel electrode 207 is electrically connected with the first drain 2052 through a via.

The touch control dual-gate TFT 220 includes a second gate 2022 (a bottom gate) on the lower substrate 201, the first insulation layer (the gate insulation layer) 203 on the second gate 2022, a second active layer 2044 (possibly of an amorphous silicon material or another semiconductor material and possibly in one or more layers) on the first insulation layer 203, a second source 2053 and a second drain 2054 on the second active layer 2044, the second insulation layer (the passivation layer) 206 above the second source 2053 and the second drain 2054, and a third gate 208 (a top gate) above the second insulation layer 206, where the second source 2053 and the second drain 2054 are separate from each other and electrically connected respectively with the second active layer 2042; the second source 2053 and the second drain 2054 have a channel formed of the first active layer 2041 between them, and the third gate 208 is located above the channel, and the second active layer 2042, the second source 2053 and the second drain 2054 are insulated from each other; and second gate 2022 is located below the channel, and the second active layer 2042, the second source 2053 and the second drain 2054 are insulated from each other.

It shall be noted that the expression "located on . . . " here refers to that both of them may or may not be in direction contract, for example, "the first gate 2021 on the lower substrate 201" refers to that the lower substrate 201 and the first gate 2021 may or may not be in direction contract. The same will apply to those expressions "located on . . . " and the like elsewhere in the document of this application.

As can be further apparent from FIG. 5, FIG. 6 and FIG. 9, the first gate 2021, the second gate 2022, the scan line S and the touch control gate line TG are located at the same layer and of the same material; and the scan line S and the touch control gate line TG extend in the same direction (a first direction). The first drain 2051, the first drain 2052, the second source 2053, the second drain 2054, the data line D, the touch control drive line TD and the touch control sense line TS are located at the same layer and of the same material; and the data line D, the touch control drive line TD and the touch control sense line TS extend in the same direction (a second direction). Where the first direction intersects with the second direction (typically possibly intersect perpendicularly). The touch control dual-gate TFT 220 shares the first insulation layer 203 and the second insulation layer 206 with the switch TFT 210. The third gate 208 of the touch control dual-gate TFT 220 can be located at the same layer and of the same material as the pixel electrode 207. Of course the third gate 208 can alternatively be located at a different layer and of a different material from the pixel electrode 207, for example, the pixel electrode is of ITO, IZO, etc., and the third gate 208 is of a metal material.

As can be apparent, the pixel array and the touch control dual-gate TFT array are compatible and both of them can be fabricated concurrently on the layered structure. Specifically a part of the touch control dual-gate TFT 220 is structurally identical to that of the switch TFT 210 except that the former has a top gate in addition to the latter. The respective components of the switch TFT 210 can have their corresponding structures located in the touch control dual-gate TFT 220, and both of them are located at the same layer and of the same material and can be fabricated concurrently in the same process steps. Moreover both the touch control drive line TD and the touch control sense line TS of the touch control dual-gate TFT array are located at the same layer and of the same material as the data line D of the pixel array and can be fabricated concurrently in the same process step; and the touch control gate line TG of the touch control dual-gate TFT array is located at the same layer and of the same material as the scan line S of the pixel array and can be fabricated concurrently in the same process step.

It shall be noted that in the foregoing description of FIG. 9, 1051 is the source of the switch TFT 210 and 1052 is the drain of the switch TFT 210; but those ordinarily skilled in the art shall appreciate that 1051 can be the drain of the switch TFT 210 and the 1052 can be the source of the switch TFT 210. Alike 1053 can be the drain of the touch control dual-gate TFT 220 and 1054 can be the source of the touch control dual-gate TFT 220.

A touch control operation process according to the first embodiment of the invention will be set forth below in connection with FIG. 3, FIG. 5, FIG. 6 and FIG. 9:

Referring to FIG. 5, a touch control gate signal is applied to the touch control gate lines TG to control an on/off state of the touch control dual-gates TFT 220; a touch control drive signal is applied to the touch control drive lines TD to make the touch control dual-gate TFTs 220 generate current when they are switched on; and a touch control sense signal is output from the touch control sense lines TS. It shall be noted that the touch control gate signal is applied to the touch control gate lines TG per row, and the touch control dual-gate TFTs 220 are switched on per row; the touch control drive signal can be applied to the touch control drive lines TD concurrently or per column; and the touch control sense signal can alternatively be output from the touch control sense lines TS concurrently or per column. As such all the touch control dual-gates TFT 220 can be cycled for touch control sensing throughout the screen.

Referring to FIG. 6 and FIG. 9, for a specific touch control dual-gate TFT 220, if the touch control dual-gate TFT 220 is not switched on, then no sense signal will be output regardless of whether there is a touch control occurring. If the touch control dual-gate TFT 220 is switched on, then in this case, when there is no touch control occurring, the free end 1101 of the electrically conductive post 110 has no contact with the TFT array substrate 200 and is sufficiently distant from the TFT array substrate 200 that an electric field of the electrically conductive post 110 cannot modulate a channel current of the touch control dual-gate TFT 220, and at this time the un-modulated touch control sense will be output; and when there is a touch control occurring, the electrically conductive post 110 approaches the TFT array substrate 200 along with a press and modulates the current of the touch control dual-gate TFT 220, and at this time the modulated touch control sense current will be output. In connection with cycling all the touch control dual-gate TFTs 220 for touch control sensing throughout the screen as set forth in the previous paragraph, if the modulated touch control sense current is output, then the location is determined to have a touch control occurring; otherwise, the location is determined to have no touch control occurring.

It shall be further noted that in the sectional view of the touch control display panel illustrated in FIG. 9, the switch TFT 210 in the pixel element is a bottom-gate TFT, and the second gate 2022 (the bottom gate) of the touch control dual-gate TFT 220 is electrically connected with the touch control gate line TG, and both of them are located at the same layer and of the same material and have both their structures and processes compatible. The electrically conductive post 110 is arranged in correspondence to the touch control dual-gate TFT 220, that is, the electrically conductive post 110 is located exactly facing the third electrode 208 (the top gate) of the touch control dual-gate TFT 220. When there is a touch control occurring, the electrically conductive post 110 may be electrically connected with the third electrode 208 (the top gate) of the touch control dual-gate TFT 220; or the electrically conductive post 110 may not be electrically connected with the third electrode 208 (the top gate) of the touch control dual-gate TFT 220 but are sufficiently close to the third electrode 208 (the top gate) of the touch control dual-gate TFT 220 to have the current of the touch control dual-gate TFT modulated by the electrically conductive post 110. Specifically when the free end 1101 of the electrically conductive post 110 is sufficiently close to the third electrode 208 (the top gate) of the touch control dual-gate TFT 220, although the free end 1101 of the electrically conductive post 110 is not electrically connected with the third electrode 208 (the top gate) of the touch control dual-gate TFT 220, the free end 1101 of the electrically conductive post 110 and the third electrode 208 (the top gate) of the touch control dual-gate TFT 220 can have a sufficiently large capacitance developed between them that a finger or other touching object can have a pulse signal generated on the electrically conductive post 110 transmitted to the third electrode 208 (the top gate) of the touch control dual-gate TFT 220 through the capacitance to further modulate the channel current of the touch control dual-gate TFT 220.

However the switch TFT 210 in the pixel element can alternatively be a top-gate TFT with the electrically conductive post 110 being arranged in correspondence to the control dual-gate TFT 220; and the electrically conductive post 110 may not necessarily be exactly facing the third electrode 208 (the top gate) of the touch control dual-gate TFT 220, as set forth below in details.

Figure 10:
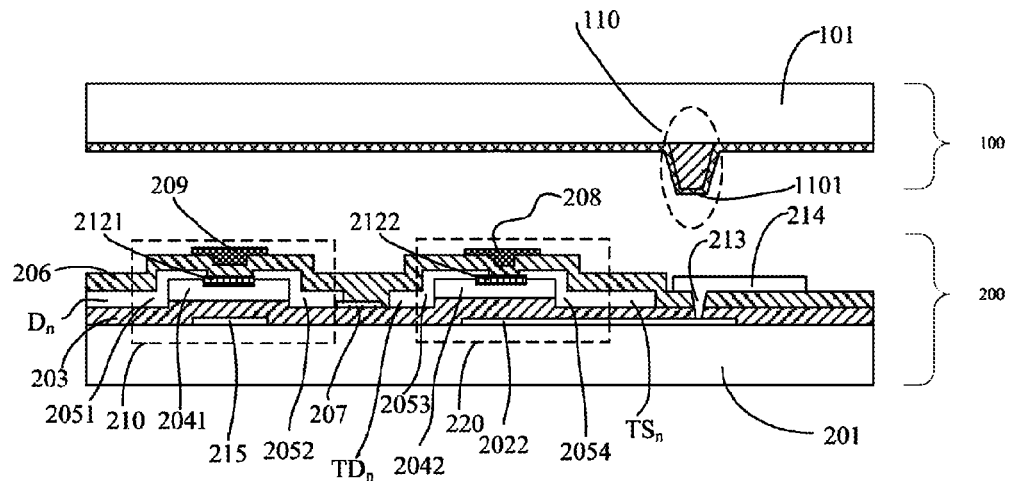
FIG. 10 is another schematic structural sectional view of the touch control display panel including the TFT array substrate illustrated in FIG. 5 along A-A'.

FIG. 10 is another schematic structural sectional view of the touch control display panel including the TFT array substrate illustrated in FIG. 6 along A-A'. As can be apparent from FIG. 3, FIG. 5, FIG. 6 and FIG. 10, the TFT array substrate 200 includes a lower substrate 201 and a TFT array on the lower substrate 201.

The switch TFT 210 in the pixel element is a top-gate TFT including a first insulation layer (a gate insulation layer) 203 below the lower substrate 201, a first active layer 2041

(possibly of a low-temperature poly-silicon material or an oxide semiconductor material, e.g., IGZO (Indium Gallium Zinc Oxide) or another semiconductor material, and possibly in one or more layers) on the first insulation layer 203, a first source 2051 and a first drain 2052 on the first active layer 2041, and a second insulation layer (a passivation layer) 206 above the first source 2051, the first drain 2052 and the pixel electrode 207, where the first source 2051 and the first drain 2052 are separated from each other and electrically connected respectively with the first active layer 2041; the first source 2051 and the first drain 2052 have a channel formed of the first active layer 2041 between them; a photo-resist barrier layer 2121 is further arranged between the active layer 2041 and the second insulation layer 206 in the channel area; the first drain 2052 is on the pixel electrode 207 and electrically connected with the pixel electrode 207; a fourth gate 209 (a top gate) is located above the channel; and the pixel electrode 207 is located between the first insulation layer 203 and the second insulation layer and electrically connected with the first drain 2052. Moreover preferably a light shielding electrode 215 is further arranged in the channel area between the lower substrate 201 and the first insulation layer 203 in the figure although the light shielding electrode 215 can be omitted.

The touch control dual-gate TFT 220 includes a second gate 2022 (a bottom gate) on the lower substrate 201, the first insulation layer (the gate insulation layer) 203 on the second gate 2022, a second active layer 2042 (possibly of a low-temperature poly-silicon material or an oxide semiconductor material, e.g., IGZO (Indium Gallium Zinc Oxide) or another semiconductor material, and possibly in one or more layers) on the first insulation layer 203, a second source 2053 and a second drain 2054 on the second active layer 2042, the second insulation layer (the passivation layer) 206 above the second source 2053 and the second drain 2054, and a third gate 208 (a top gate) above the second insulation layer 206, where the second source 2053 and the second drain 2054 are separated from each other and electrically connected respectively with the second active layer 2042; the second source 2053 and the second drain 2054 have a channel formed of the first active layer 2041 between them; a photo-resist barrier layer 2122 is further arranged between the active layer 2042 and the second insulation layer 206 in the channel area; the third gate 208 is located above the channel, and the second active layer 2042, the second source 2053 and the second drain 2054 are insulated from each other; and the second gate 2022 is located below the channel, and the second active layer 2042, the second source 2053 and the second drain 2054 are insulated from each other; and the second gate 2022 is located. Moreover the TFT array substrate 200 further includes a touch control electrode 214 on a surface layer thereof, which is electrically connected with the second gate 2022 through a via 213 traversing the first insulation layer 203 and the second insulation layer 206.

As can be further apparent from FIG. 5, FIG. 6 and FIG. 10, the light shielding electrode 215 and the second gate 2022 are located at the same layer and of the same material. The third gate 208, the fourth gate 209, the scan line S and the touch control gate line TG are located at the same layer and of the same material; and the scan line S and the touch control gate line TG extend in the same direction (a first direction). The first source 2051, the first drain 2052, the second source 2053, the second drain 2054, the data line D, the touch control drive line TD and the touch control sense line TS are located at the same layer and of the same material; and the data line D, the touch control drive line TD and the touch control sense line TS extend in the same direction (a second direction). Where the first direction intersects with the second direction. The touch control dual-gate TFT 220 shares the first insulation layer 203 and the second insulation layer 206 with the switch TFT 210.

As can be apparent, the pixel array and the touch control dual-gate TFT array are compatible and both of them can be fabricated concurrently on the layered structure. Specifically a part of the touch control dual-gate TFT 220 is structurally identical to that of the switch TFT 210 except that the former has a bottom gate in addition to the latter, but the light shielding electrode of the switch TFT 210 can exactly be located at the same layer and of the same material as the bottom gate of the touch control dual-gate TFT 220. Thus the respective components of the switch TFT 210 can have their corresponding structures located in the touch control dual-gate TFT 220, and both of them are located at the same layer and of the same material and can be fabricated concurrently in the same process steps. Moreover both the touch control drive line TD and the touch control sense line TS of the touch control dual-gate TFT array are located at the same layer and of the same material as the data line D of the pixel array and can be fabricated concurrently in the same process step; and the touch control gate line TG of the touch control dual-gate TFT array is located at the same layer and of the same material as the scan line S of the pixel array and can be fabricated concurrently in the same process step.

Again it shall be noted that in the foregoing description of FIG. 7, 1051 is the source of the switch TFT 210 and 1052 is the drain of the switch TFT 210; but those ordinarily skilled in the art shall appreciate that 1051 can be the drain of the switch TFT 210 and the 1052 can be the source of the switch TFT 210. Again 1053 can be the drain of the touch control dual-gate TFT 220 and 1054 can be the source of the touch control dual-gate TFT 220.

A touch control operation process of the corresponding touch control display panel will be set forth below in connection with FIG. 3, FIG. 5, FIG. 6 and FIG. 10:

Referring to FIG. 5, a touch control gate signal is applied to the touch control gate lines TG to control an on/off state of the touch control dual-gates TFT 220; a touch control drive signal is applied to the touch control drive lines TD to make the touch control dual-gate TFTs 220 generate current when they are switched on; and a touch control sense signal is output from the touch control sense lines TS. It shall be noted that the touch control gate signal is applied to the touch control gate lines TG per row, and the touch control dual-gate TFTs 220 are switched on per row; the touch control drive signal can be applied to the touch control drive lines TD concurrently or per column; and the touch control sense signal can alternatively be output from the touch control sense lines TS concurrently or per column. As such all the touch control dual-gates TFT 220 can be cycled for touch control sensing throughout the screen.

Referring to FIG. 6 and FIG. 10, for a specific touch control dual-gate TFT 220, if the touch control dual-gate TFT 220 is not switched on, then no sense signal will be output regardless of whether there is a touch control occurring. If the touch control dual-gate TFT 220 is switched on, then in this case, when there is no touch control occurring, the free end 1101 of the electrically conductive post 110 has no contact with the TFT array substrate 200 and is sufficiently distant from the TFT array substrate 200 that an electric field of the electrically conductive post 110 can not modulate a channel current of the touch control dual-gate TFT 220, and at this time the un-modulated touch control sense will be output; and when there is a touch control occurring, the electrically conductive post 110 approaches the TFT array substrate 200 along with a press and modulates the current of the touch control dual-gate TFT 220, and at this time the modulated touch control sense current will be output. In connection with cycling all the touch control dual-gate TFTs 220 for touch control sensing throughout the screen as set forth in the previous paragraph, if the modulated touch control sense current is output, then the location is determined to have a touch control occurring; otherwise, the location is determined to have no touch control occurring.

It shall be further noted that in the sectional view of the touch control display panel illustrated in FIG. 7, the switch TFT 210 in the pixel element is a top-gate TFT, and the third gate 208 (the top gate) of the touch control dual-gate TFT 220 is electrically connected with the touch control gate line TG, and both of them are located at the same layer and of the same material and have both their structures and processes compatible. The electrically conductive post 110 is arranged in correspondence to the touch control dual-gate TFT 220, that is, the electrically conductive post 110 is located exactly facing the touch control electrode 214 (at this time the electrically conductive post 110 is not arranged exactly facing the touch control dual-gate TFT 220). When there is a touch control occurring, the electrically conductive post 110 may be electrically connected with the touch control electrode 214; or the electrically conductive post 110 may not be electrically connected with the touch control electrode 214 but are sufficiently close to the touch control electrode 214 to have the current of the touch control dual-gate TFT modulated by the electrically conductive post 110. Specifically when the free end 1101 of the electrically conductive post 110 is sufficiently close to the touch control electrode 214, although the free end 1101 of the electrically conductive post 110 is not electrically connected with the touch control electrode 214, the free end 1101 of the electrically conductive post 110 and the touch control electrode 214 can have a sufficiently large capacitance developed between them that a finger or other touching object can have a pulse signal generated on the electrically conductive post 110 transmitted to the touch control electrode 214 through the capacitance and further to the second gate 2022 of the touch control dual-gate TFT 220 to thereby modulate the channel current of the touch control dual-gate TFT 220.

Referring to FIG. 5, FIG. 6 and FIG. 9 or to FIG. 5, FIG. 6 and FIG. 10, in this embodiment, the touch control drive lines TD and the touch control sense lines TS are insulated from each other and extend in the same direction, and both of them intersect with but are insulated from each other; and coordinates of touch control sensing can be determined by the touch control drive lines TD and the touch control sense lines TS thus intersecting with but insulated from each other (at this time the touch control drive signal can only be input to the touch control drive lines TD per column, but the touch control sense signal can be output from the touch control sense lines TS concurrently or per column). Of course coordinates of touch control sensing can also be determined by the touch control gate lines TG and the touch control sense lines TS intersecting with but insulated from each other (at this time the touch control sense signal can only be output from the touch control sense lines TS per column, but the touch control drive signal can be input to the touch control drive lines TD concurrently or per column).

Figure 11:
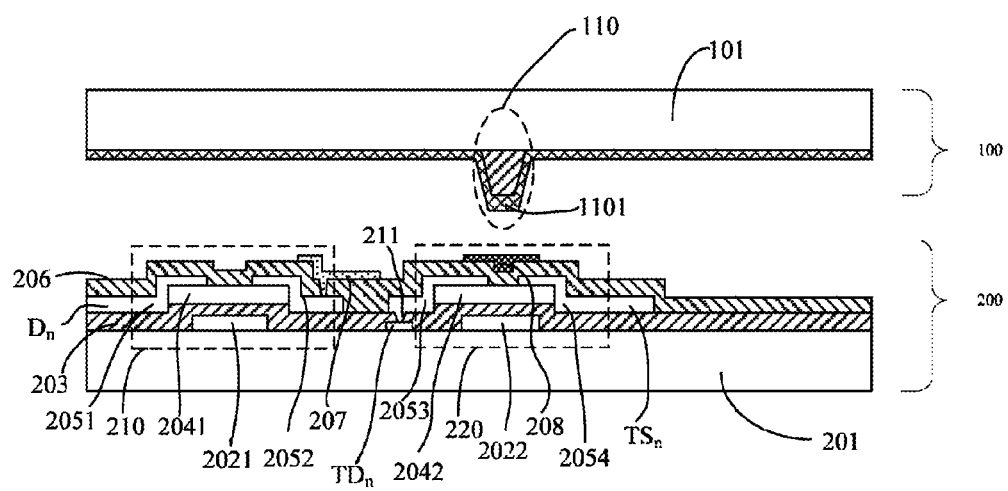
FIG. 11 is a schematic structural sectional view of the touch control display panel including the TFT array substrate illustrated in FIG. 7 along A-A'.

In addition to touch control coordinates being determined by the touch control gate lines TG and the touch control drive lines TD intersecting with but insulated from each other or touch control coordinates being determined by the touch control gate lines TG and the touch control sense lines TS intersecting with but insulated from each other, the touch control display panel structured to have touch control coordinates determined by the touch control drive lines TD and the touch control sense lines TS intersecting with but insulated from each other is also possible. FIG. 7 is another schematic structural top view of the TFT array substrate in FIG. 2. FIG. 9 is a magnified view of the dotted area in FIG. 8. FIG. 11 is a schematic structural sectional view of the touch control display panel including the TFT array substrate illustrated in FIG. 7 along A-A'. For the sake of a concise description, a repeated description of those components in FIG. 7, FIG. 8 and FIG. 11 corresponding respectively to those in FIG. 5, FIG. 6 and FIG. 9 will be omitted here. As opposed to the TFT array substrate 200 illustrated in FIG. 5 and FIG. 7, both the touch control gate lines TG and the touch control drive lines TD are insulated from and extend in the same direction as the scan lines S; and the touch control sense TS and the data lines D are insulated from each other and extend in the same direction. The touch control sense lines TS intersect with but are insulated from both the touch control gate lines TG and the touch control drive lines TD. As opposed to FIG. 9, in the schematic structural sectional view illustrated in FIG. 11 of the touch display panel along A-A', the touch control drive lines TD, the touch control gate line TG and the scan lines S are located at the same layer and of the same material; and the touch control drive lines are electrically connected with the sources (or the drains) 1053 of the touch control dual-gate TFTs 220 through the vias 211 traversing the first insulation layer 203. The touch control sense lines TS and the data lines D are located at the same layer and of the same material and extend in the same direction.

Of course, alike, the touch display panel having touch control coordinates determined by the touch control drive lines TD and the touch control sense lines TS intersecting with but insulated from each other can further have the touch control sense lines TS, the touch control gate lines TG and the scan lines S located at the same layer, of the same material and extending in the same direction, and the touch control sense lines TS and the drains (or the sources) 1054 of the touch control dual-gate TFTs 220 through the vias traversing the first insulation layer 203 (not illustrated). The touch control drive lines TD and the data lines D are located at the same layer and of the same material and extend in the same direction In a preferred implementation, unlike FIG. 11 where the switch TFT 210 is still a bottom-gate TFT by way of an example, the touch control display panel having touch control coordinates determined by the touch control drive lines TD and the touch control sense lines TS intersecting with but insulated from each can alternatively adopt the top-gate TFT illustrated in FIG. 10, and the touch control drive lines TD can alternatively be located at the same layer as the second gates 2022 and connected with the second sources 2053 through the vias traversing the first insulation layer 203; or the touch control sense lines TS can alternatively be located at the same layer as the second gates 2022 and connected with the second drains 2054 through the vias traversing the first insulation layer 203. Moreover the touch control drive lines TD can alternatively be located at the same layer as the third gates 208 and connected with the second sources 2053 through the vias of the second insulation layer 206; or the touch control sense lines TS can alternatively be located at the same layer as the third gates 208 and connected with the second drains 2054 through the vias of the second insulation layer 206.

For the color film substrate illustrated in FIG. 4, the electrically conductive layer 111 thereon connecting the plurality of electrically conductive posts 110 includes a plurality of first conductive lines 1111 separate from each other, and each first conductive line 1111 is electrically connected with at least an electrically conductive post 110. Typically the respective first conductive lines 1111 are arranged in parallel, and each first conductive line 1111 is connected with a row or column of electrically conductive posts 110. Then simply at least two ones of the touch control drive lines TD, the touch control sense lines TS, the touch control gate lines TG and the first conductive lines 1111 intersect with but are insulated from each other so that touch control coordinates (coordinates of the touch control location) can be determined by the least two ones intersecting with but insulated from each other. There are generally two schemes, and in the first scheme, touch control coordinates can be determined without the use of the first conductive lines 1111, that is, the first conductive lines 1111 extend in any direction, and simply at least two ones of the touch control drive lines, the touch control sense lines and the touch control gate lines intersect with but are insulated from each other so that touch control coordinates can be determined by the least two ones intersecting with but insulated from each other. That is, all the three ones of the touch control drive lines, the touch control sense lines and the touch control gate lines intersect with but are insulated from each other; or two ones of the touch control gate lines TG, the touch control drive lines TD and the touch control sense lines TS intersect with but are insulated from each other, and the remaining ones extend in any direction (typically the same as the direction in which either of the two ones intersecting with but insulated from each other extend). This is equivalent to the scheme to determine touch control coordinates after the color film substrate illustrated in FIG. 3 is adopted.

In the second scheme, touch control coordinates can be determined using the first conductive lines 1111 as well, that is, the first conductive lines 1111 intersect with but are insulated from any ones of the touch control gate lines TG, the touch control drive lines TD and the touch control sense lines TS, and the remaining two ones extend in any direction (typically can extend in the same direction as the first conductive lines 111).

Thus the touch control display panel adopting the color film substrate illustrated in FIG. 4 can have touch control coordinates determined by two ones intersecting with but insulated from each other among the touch control drive lines TD, the touch control sense lines TS, the touch control gate lines TG and the first conductive lines 1111. The TFT array substrate of the touch control display panel adopting the color film substrate illustrated in FIG. 4 can have the same structure as that the TFT array substrate of the touch control display panel adopting the color film substrate illustrated in FIG. 3 (as illustrated in FIG. 5 to FIG. 11), so a repeated description thereof will be omitted here.

In summary, the pixel array and the touch control dual-gate TFT array in the touch control display panel according to the first embodiment are arranged separately from and structurally compatible with each other. The switch TFTs 210 in the pixel elements can be bottom-gate TFTs or top-gate TFTs; the active layers in the switch TFTs 210 and the touch control dual-gate TFTs 220 can be of amorphous silicon, poly-silicon, an oxide semiconductor or other numerous semiconductor materials; the layered structure can be designed variously; the electrically conductive posts may or may not be arranged exactly facing the touch control dual-gate TFTs 220; and touch control coordinates can be determined by any two ones intersecting with but insulated from each other among the touch control drive lines TD, the touch control sense lines TS, the touch control gate lines TG and the first conductive lines 1111. FIG. 9 (or FIG. 11) and FIG. 10 merely illustrate two typical TFT structures. However the structures of the switch TFTs and the touch control dual-gate TFTs according to the invention will not be limited to those illustrated in FIG. 9 (or FIG. 11) and FIG. 10 in light of the core idea of the invention. Also if the structures of the switch TFTs and the touch control dual-gate TFTs are designed otherwise, then location relationships between the scan lines and the data lines of the pixel array and the touch control gate lines, the touch control drive lines and the touch control sense lines of the touch control dual-gate TFTs array can be adjusted as appropriate in light of common knowledge in the art.

Moreover the color film substrate in the touch control display panel according to the first embodiment of the invention can be structured variously.

Figure 12:
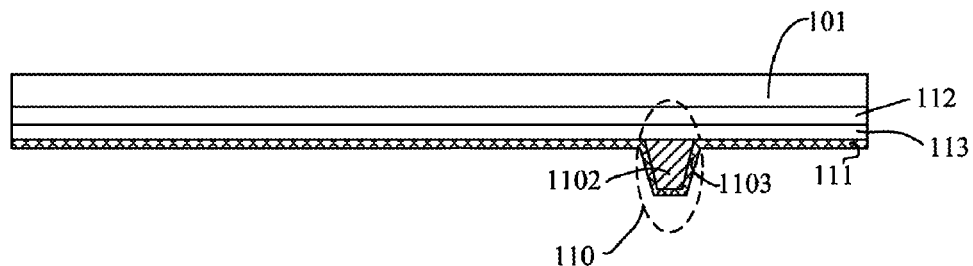
FIG. 12 is a schematic structural sectional view of the color film substrate according to the first embodiment of the invention.

FIG. 12 is a schematic structural sectional view of the color film substrate according to the first embodiment of the invention. As can be apparent from FIG. 12, the color film substrate 100 includes an upper substrate 101, and a black matrix layer 112, a color-resist layer 113, electrically conductive posts 110 and a first electrically conductive layer 111 on the upper substrate 101 in that order. The electrically conductive posts 110 include insulation post bodies 1102 and a second electrically conductive layer 103 on the surface of the insulation post bodies 1102; and the first electrically conductive layer 111 is connected with the second electrically conductive layer 1103. In a preferred implementation, the first electrically conductive layer 111 and the second electrically conductive layer 1103 can be located on the same material and of the same material (e.g., ITO, IZO or another transparent electrically conductive material) and can be formed in the same process step.

Figure 13:
FIG. 13 is another schematic structural sectional view of the color film substrate according to the first embodiment of the invention.

In FIG. 12, the first electrically conductive layer 111 and the second electrically conductive layer 1103 are transparent, and therefore the additional black matrix layer 112 is required to prevent light leakage. However the color film substrate in the touch control display panel according to the first embodiment of the invention can alternatively be structured as illustrated in FIG. 13. In FIG. 3, the first electrically conductive layer 111 and/or the second electrically conductive layer 1103 are/is a grid-like metal layer(s) and shielded by the black matrix layer 112. In a further preferred implementation, the black matrix layer 112 can be omitted, but the grid-like metal layer(s) can directly act as a black matrix.

Figure 14:
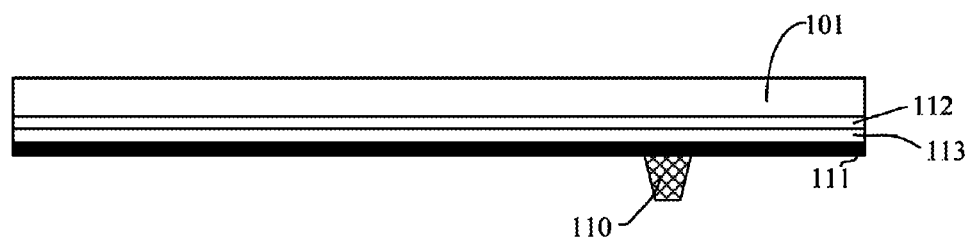
FIG. 14 is a third schematic structural sectional view of the color film substrate according to the first embodiment of the invention.

In FIG. 12, the electrically conductive posts 110 include the insulation post bodies 1102 and the second electrically conductive layer 1103 on the insulation post bodies, but the electrically conductive posts can alternatively be structured as illustrated in FIG. 14. As can be apparent from FIG. 14, the color film substrate 100 includes an upper substrate 101, and a black matrix layer 112, a color-resist layer 113, a first electrically conductive layer 111 and electrically conductive posts 110 on the upper substrate 101 in that order. The electrically conductive posts 110 are of an electrically conductive organic material. The first electrically conductive layer 111 can be of ITO, IZO or another transparent electrically conductive material or can be a grid-like metal layer shielded by a black matrix. In a further preferred implementation, the black matrix layer 112 can be omitted, but the grid-like metal layer can directly act as a black matrix, that is, the first electrically conductive layer 111 is an electrically conductive black matrix, and at this time the black matrix is located between the color-resist layer and the electrically conductive posts.

Figure 15:
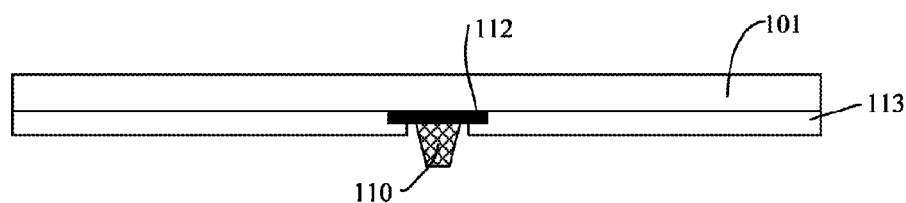
FIG. 15 is a fourth schematic structural sectional view of the color film substrate according to the first embodiment of the invention.

Moreover as in FIG. 15, the color film substrate 100 includes an upper substrate 101 and a color-resist layer 113, and a black matrix 112 is located between the upper substrate 101 and the color-resist layer 113. The color-resist layer is a color-resist array composed of a plurality of color-resist elements (R, G, B, etc.), and the black matrix 112 covers areas between adjacent color-resist elements. Electrically conductive posts 110 of an electrically conductive material are arranged directly on the electrically conductive black matrix 112.

In summary, the color film substrate in the touch control display panel according to the first embodiment of the invention includes electrically conductive posts and a first electrically conductive layer connecting the electrically conductive posts; and particular structures of and location relationships between the electrically conductive posts, the first electrically conductive layer and other components of the color film substrate (e.g., an upper substrate, a black matrix, a color-resist layer, etc.) can be designed variously but will not be limited to those illustrated in FIG. 12 to FIG. 15. Moreover the sectional views illustrated in FIG. 12 to FIG. 15 can correspond to the top view in FIG. 3 or can correspond to the top view in FIG. 4.

As motioned in the foregoing description of FIG. 2, the touch control display panel according to the first embodiment of the invention has the color film substrate 100 and the TFT array substrate 200 arranged in opposition and bonded together through the frame sealing glue on the periphery of the touch control display panel (not illustrated). In order to maintain a stable distance between the color film substrate 100 and the TFT array substrate 200, the touch control display panel according to the first embodiment of the invention further primary posts 114 in addition to the electrically conductive posts 110. When there is no trigger control occurring, the primary posts 114 comes into contact at both ends thereof respectively with the TFT array substrate 200 and the color substrate 100, and the free ends 1101 of the electrically conductive posts 110 have no contact with the TFT substrate array 200. Thus even if there is an external force pressing, the primary posts 114 can maintain a stable distance between the color film substrate 100 and the TFT array substrate 200. Moreover the primary posts 114 can be of the same materials and prepared in the same process step as the electrically conductive posts 110. Thus the length H1 of the primary posts 114 per se can be equal to that of the electrically conductive posts 110 per se. However in a design, the thickness H3 of the TFT array substrate 200 exactly facing the primary posts 114 is larger than that of the thickness H4 of the TFT array substrate 200 exactly facing the electrically conductive posts 110 and/or the thickness H5 of the color film substrate 100 exactly facing the primary posts 114 is larger than that of the thickness H6 of the color film substrate 100 exactly facing the electrically conductive posts 110.

In a preferred embodiment, the primary posts 114 can be divided into first primary posts 1141 and second primary posts 1142. Taking the color film substrate illustrated in FIG. 15 (of course, or the color film substrates illustrated in FIG. 12 to FIG. 14), the first primary posts 1141 are of an electrically conductive material and have upper ends connected with the first electrically conductive layer 111 on the color film substrate 100 (in the figure, taking the electrically conductive layer 111 also acting the black matrix 112 as an example) and lower ends connected with signal input terminals 216 on the TFT array substrate 200; and thus the first primary posts 1141 transmit an external drive signal or a fixed voltage from the TFT array substrate 200 to the first electrically conductive layer 111 on the color film substrate 100 to provide a signal for touch control. The second primary posts 1142 come into isolated contact with the color film substrate 100 and/or the TFT array substrate 200 and merely function for supporting. Moreover for a touch display liquid crystal display panel, a liquid crystal layer 300 is further arranged between color film substrate 100 and the TFT array substrate 200, and the first primary posts 1141 can be located in the frame sealing glue or can be located on a side of the frame sealing glue proximate to the liquid crystal layer 300 or can be located on a side of the frame sealing glue distant from the liquid crystal layer 300 (not illustrated).

Moreover the touch control display panel according to the first embodiment of the invention can further a scan drive circuit electrically connected with the scan lines, a data drive circuit electrically connected with the data lines, a touch control gate drive circuit electrically connected with the touch control gate lines, a touch control drive signal generation circuit electrically connected with the touch control drive lines, and a touch control detection circuit electrically connected with the touch control sense lines.

A Second Embodiment of the Invention

FIG. 2 also illustrates a structural 3D view of a touch control display panel according to the second embodiment of the invention, and for the sake of simplicity, a repeated description of commonalities to the first embodiment will be omitted here. The TFT array substrate 200 in the touch control display panel according to the second embodiment includes a pixel array and a touch control dual-gate TFT array, and the pixel array and the touch control dual-gate TFT array are not arranged separately but instead scan lines of the pixel array and touch control gate lines of the touch control dual-gate TFT array are common.

Figure 17:
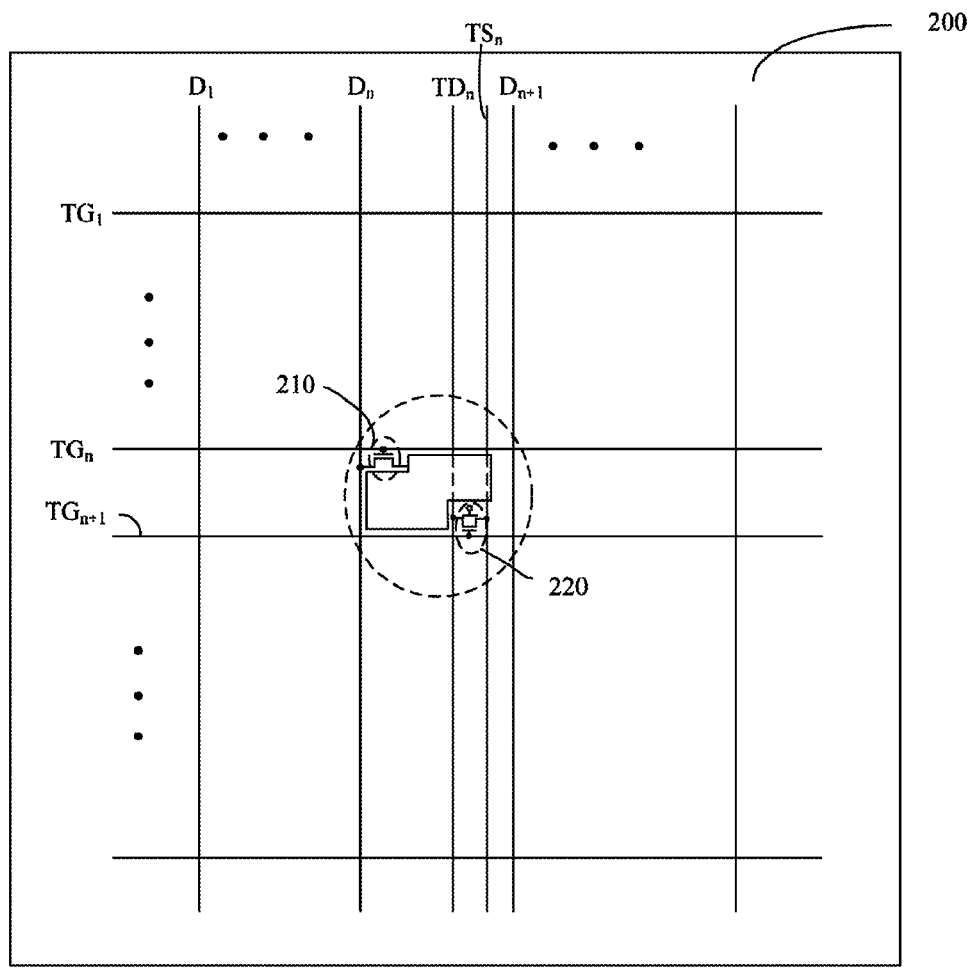
FIG. 17 is a schematic structural top view of a TFT array substrate according to a second embodiment of the invention.
Figure 18:
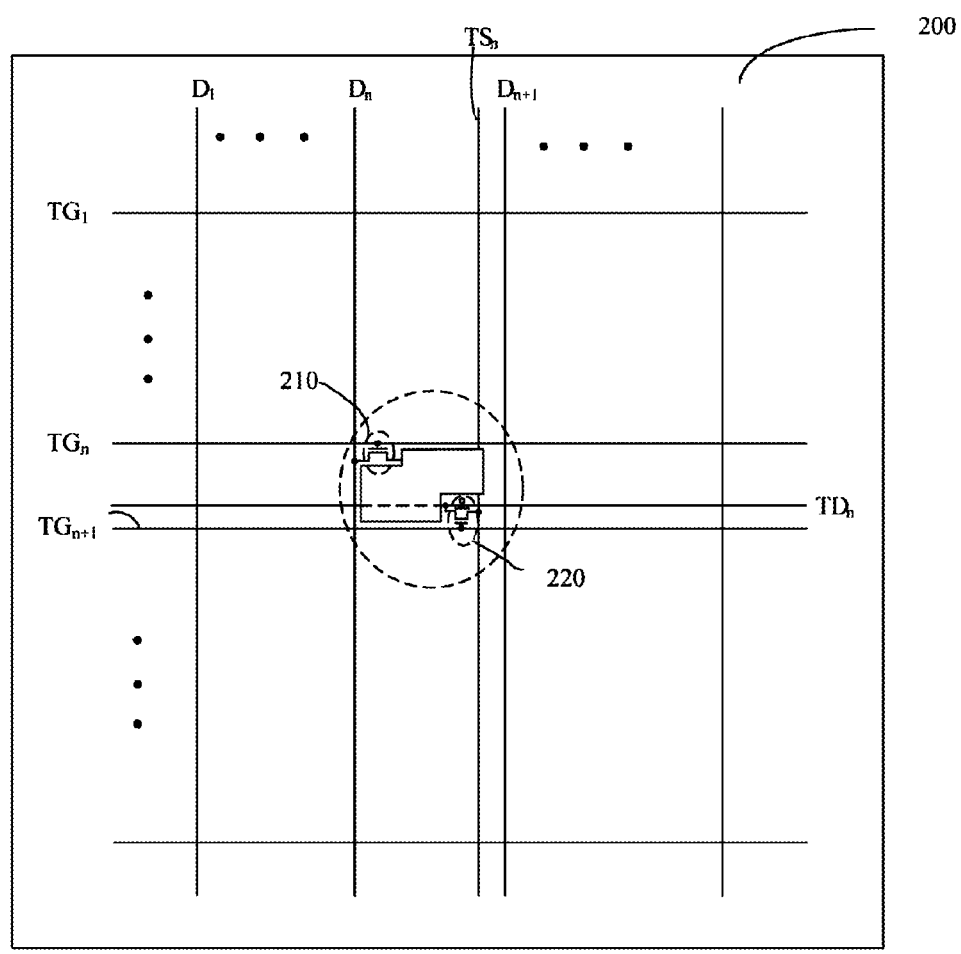
FIG. 18 is another schematic structural top view of the TFT array substrate according to the second embodiment of the invention.

Referring to FIG. 17 and FIG. 18, the structure of the touch control dual-gate TFT array according to the second embodiment of the invention is the same as those of the touch control dual-gate TFT array illustrated in FIG. 5 and FIG. 6, and FIG. 7 and FIG. 8 except that the scan lines of the pixel array and the touch control gate lines of the touch control dual-gate TFT array are common in the second embodiment illustrated in FIG. 17 and FIG. 18, and at this time a touch control gate signal of the touch control dual-gate TFT array is a scan line signal of the pixel array. Specifically the touch control dual-gate TFT array in the TFT array substrate 200 includes:

A plurality of touch control drive line; a plurality of touch control sense lines; a plurality of touch control gate lines; and a plurality of touch control dual-gate TFTs, top gates/bottom gates of the touch control dual-gate TFTs being electrically connected with the touch control gate lines, sources/drains of the touch control dual-gate TFTs being electrically connected with the touch control drive lines, and the drains/the sources of the touch control dual-gate TFTs being electrically connected with the touch control sense lines; and In this embodiment, the touch control gate lines also act as scan lines of the pixel array, so the TFT array substrate 200 includes a pixel array in addition to the foregoing touch control dual-gate TFT array, and the pixel array share the plurality of touch control gate lines as scan lines; and moreover the pixel array further includes:

A plurality of data lines intersecting with but insulated from the plurality of touch control gate lines (i.e., scan lines); and a plurality of pixel elements, each of which is arranged in a pixel area surrounded by adjacent touch control gate lines (i.e., scan lines) and adjacent data lines. Typically the pixel elements include switch TFTs and pixel electrodes; and gates of the switch TFTs are electrically connected with the touch control gate lines (i.e., the scan lines), sources/drains of the switch TFTs are electrically connected with the data lines, and the drains/the sources of the switch TFTs are electrically connected with the pixel electrodes.

Moreover as in the first embodiment, in addition to the traditional color film substrate, the color film substrate according to the second embodiment has a plurality of electrically conductive posts arranged in correspondence to the plurality of touch control dual-gate TFTs to module currents of the touch control dual-gate TFTs to thereby perform a touch control function. The color film substrate according to the second embodiment can also be structured as illustrated in FIG. 3 or FIG. 4, and reference can be made to the corresponding description in the first embodiment for details.

Similarly to the first embodiment, if the touch control display panel according to the second embodiment of the invention adopts the color film substrate illustrated in FIG. 3, since the plurality of electrically conductive posts 110 are electrically connected together by the integral electrically conductive layer 111, then in order to perform a touch control function, simply at least two ones of the touch control drive lines, the touch control sense lines and the touch control gate lines (i.e., the scan lines) intersect with but are insulated from each other so that touch control coordinates can be determined by the least two ones intersecting with but insulated from each other. That is, all the three ones of the touch control gate lines TG, the touch control drive lines TD and the touch control sense lines TS intersect with but are insulated from each other; or two ones of the touch control gate lines TG, the touch control drive lines TD and the touch control sense lines TS intersect with but are insulated from each other, and the remaining ones extend in any direction (typically the same as the direction in which either of the two ones intersecting with but insulated from each other extend).

For example as illustrated in FIG. 17, touch control coordinates are determined by the touch control gate lines TG and the touch control drive lines TD intersecting with but insulated from each other, or touch control coordinates are determined by the touch control gate lines (i.e., the scan lines) TG and the touch control sense lines TS intersecting with but insulated from each other. At this time the data lines D, the touch control drive lines TD and the touch control sense lines TS are located at the same layer and of the same material and extend in the same direction; and the touch control gate lines (i.e., the scan lines) TG intersect with but insulated from each of the data lines D, the touch control drive lines TD and the touch control sense lines TS.

Of course the touch control display panel structured to have touch control coordinates determined by the touch control drive lines TD and the touch control sense lines TS intersecting with but insulated from each other can also be possible as illustrated in FIG. 18. The touch control gate lines (i.e., the scan lines) TG and the touch control drive lines TD are insulated from each other and extend in the same direction; and the touch control sense lines TS and the data lines D are insulated from each other and extend in the same direction. Alike it is alternatively possible that the touch control drive lines TD and the touch control sense lines TS intersect with but are insulated from each other; the touch control gate lines (i.e., the scan lines) TG and the touch control sense lines TS are insulated from each other and extend in the same direction; and the touch control drive lines TD and the data lines D are insulated from each other and extend in the same direction.

In FIG. 17 and FIG. 18, the gate of the touch control dual-gate TFT 220 and the gate of the switch TFT 210 are connected respectively with different touch control gate lines (i.e., the scan lines TGn and TGn+1); but in fact the gate of the touch control dual-gate TFT 220 and the gate of the switch TFT 210 can be connected with the same touch control gate line (i.e., the scan line TGn or TGn+1).

Similarly to the first embodiment, if the touch control display panel according to the second embodiment of the invention adopts the color film substrate illustrated in FIG. 4, since the first electrically conductive layer 111 includes the plurality of separate first conductive lines 1111, then in order to perform a touch control function, simply at least two of the touch control drive lines, the touch control sense lines, the touch control gate lines (i.e., the scan lines) and the first conductive lines intersect with but are insulated from each other so that touch control coordinates can be determined by the two ones intersecting with but insulated from each other. Preferably touch control coordinates can be determined by the first conductive lines and the touch control gate lines (i.e., the scan lines) intersecting with but insulated from each other.

Figure 16:
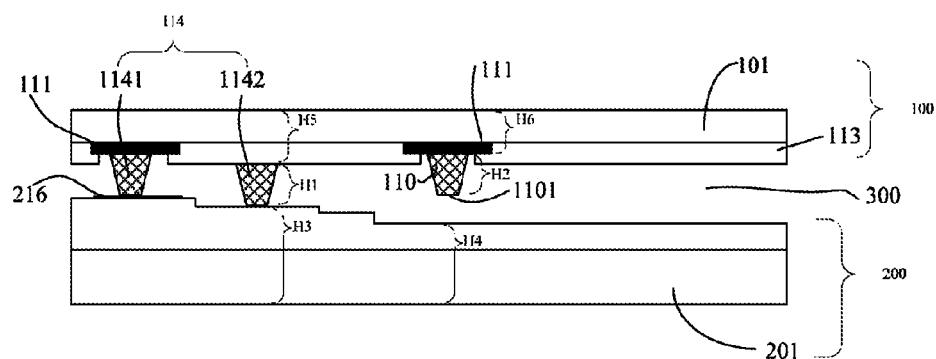
FIG. 16 is a schematic structural sectional view of the touch control display panel including primary posts and electrically conductive posts according to the first embodiment of the invention.

It shall be noted that the switch TFTs of the pixel elements in the touch control display panel according to the second embodiment of the invention can be the bottom-gate TFTs as illustrated in FIG. 9 or can be the top-gate TFTs as illustrated in FIG. 10. The electrically conductive posts can be arranged in correspondence to the touch control dual-gate TFTs in such a way that the electrically conductive posts are arranged exactly facing to the top gates of the touch control dual-gate TFTs as illustrated in FIG. 9 or that the electrically conductive posts are arranged exactly facing to the bottom gates of the touch control dual-gate TFTs as illustrated in FIG. 10. The color film can also be structured as illustrated in FIG. 12 to FIG. 15. The second embodiment can also adopt the primary posts as illustrated in FIG. 16. As compared with the first embodiment, the remaining structures of the second embodiment of the invention can be common as those in the first embodiment except for the scan lines shared with the touch control dual-gate TFTs, and reference can be made to the corresponding description in the first embodiment and their drawings for details of those common structures, so a repeated description thereof will be omitted here.

Moreover the touch control display panel according to the second embodiment of the invention can further a scan drive circuit electrically connected with the touch control gate line (i.e., the scan lines), a data drive circuit electrically connected with the data lines, a touch control drive signal generation circuit electrically connected with the touch control drive lines, and a touch control detection circuit electrically connected with the touch control sense lines.

A Third Embodiment of the Invention

FIG. 2 also illustrates a structural 3D view of a touch control display panel according to the third embodiment of the invention, and for the sake of simplicity, a repeated description of commonalities to the first and second embodiments will be omitted here. The TFT array substrate 200 in the touch control display panel according to the third embodiment includes a pixel array and a touch control dual-gate TFT array, and the pixel array and the touch control dual-gate TFT array are not arranged separately but instead scan lines of the pixel array and touch control gate lines of the touch control dual-gate TFT array are common, and also data lines of the pixel array and touch control drive lines of the touch control dual-gate TFT array are common.

Figure 19:
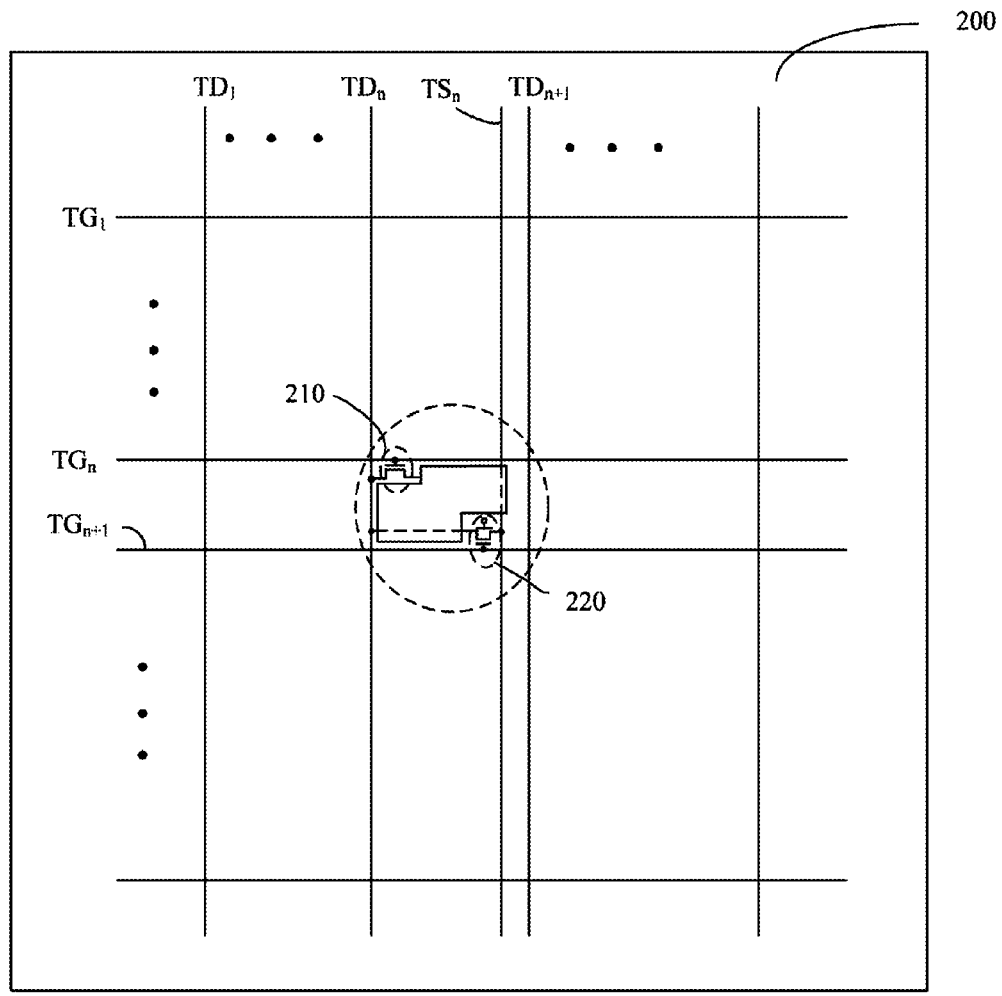
FIG. 19 is a schematic structural top view of a TFT array substrate according to a third embodiment of the invention.
Figure 20:
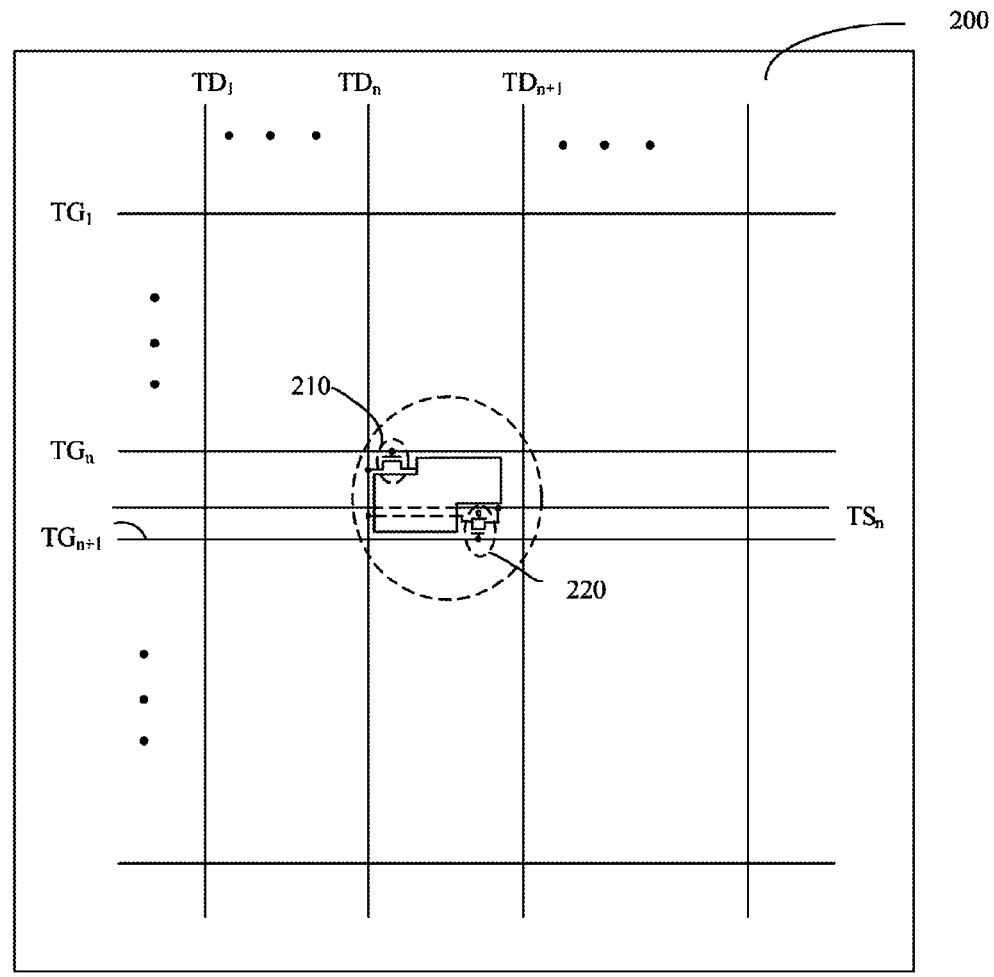
FIG. 20 is another schematic structural top view of the TFT array substrate according to the third embodiment of the invention.

Referring to FIG. 19 and FIG. 20, the structure of the touch control dual-gate TFT array according to the third embodiment of the invention is the same as those of the touch control dual-gate TFT array illustrated in FIG. 5 and FIG. 6, and FIG. 7 and FIG. 8 except that the scan lines of the pixel array and the touch control gate lines of the touch control dual-gate TFT array are common, and the data lines of the pixel array and the touch control drive lines of the touch control dual-gate TFT array are common, in the third embodiment illustrated in FIG. 19 and FIG. 20; and at this time a touch control gate signal of the touch control dual-gate TFT array is a scan line signal of the pixel array, and a touch control drive signal of the touch control dual-gate TFT array is an image data signal of the pixel array. Specifically the touch control dual-gate TFT array in the TFT array substrate 200 includes:

A plurality of touch control drive line; a plurality of touch control sense lines; a plurality of touch control gate lines; and a plurality of touch control dual-gate TFTs, top gates/bottom gates of the touch control dual-gate TFTs being electrically connected with the touch control gate lines, sources/drains of the touch control dual-gate TFTs being electrically connected with the touch control drive lines, and the drains/the sources of the touch control dual-gate TFTs being electrically connected with the touch control sense lines; and the touch control drive lines intersecting with but insulated from the touch control gate lines.

In this embodiment, the touch control gate lines also act as scan lines of the pixel array, and the touch control drive lines also act as data lines of the pixel array, so the TFT array substrate 200 includes a pixel array in addition to the foregoing touch control dual-gate TFT array, and the pixel array share the plurality of touch control gate lines as scan lines and the plurality of touch control drive lines as data lines; and moreover the pixel array further includes:

A plurality of pixel elements, each of which is arranged in a pixel area surrounded by adjacent touch control gate lines (i.e., scan lines) and adjacent touch control drive lines (i.e., data lines). Typically the pixel elements include switch TFTs and pixel electrodes; and gates of the switch TFTs are electrically connected with the touch control gate lines (i.e., the scan lines), sources/drains of the switch TFTs are electrically connected with the touch control drive lines (i.e., the data lines), and the drains/the sources of the switch TFTs are electrically connected with the pixel electrodes.

Moreover as in the first embodiment, in addition to the traditional color film substrate, the color film substrate according to the third embodiment has a plurality of electrically conductive posts arranged in correspondence to the plurality of touch control dual-gate TFTs to module currents of the touch control dual-gate TFTs to thereby perform a touch control function. The color film substrate according to the third embodiment can also be structured as illustrated in FIG. 3 or FIG. 4, and reference can be made to the corresponding description in the first embodiment for details.

Similarly to the first embodiment, if the touch control display panel according to the third embodiment of the invention adopts the color film substrate illustrated in FIG. 3. since the plurality of electrically conductive posts 110 are electrically connected together by the integral electrically conductive layer 111, then in order to perform a touch control function, simply at least two ones of the touch control drive lines (i.e., the data lines), the touch control sense lines and the touch control gate lines (i.e., the scan lines) intersect with but are insulated from each other so that touch control coordinates can be determined by the least two ones intersecting with but insulated from each other. That is, all the three ones of the touch control gate lines TG, the touch control drive lines TD and the touch control sense lines TS intersect with but are insulated from each other; or two ones of the touch control gate lines TG, the touch control drive lines TD and the touch control sense lines TS intersect with but are insulated from each other, and the remaining ones extend in any direction (typically the same as the direction in which either of the two ones intersecting with but insulated from each other extend).

For example, as illustrated in FIG. 19, touch control coordinates can be determined by the touch control gate lines (i.e., the scan lines) TG and the touch control drive lines (i.e., the data lines) TD intersecting with but insulated from each other, but at this time an image data signal shall be input to the respective touch control drive lines (i.e., data lines) per line.

However, typically an image signal is input to the respective data lines of the display panel concurrently, so touch control coordinates can be determined by the touch control gate lines (i.e., the scan lines) TG and the touch control sense lines TS intersecting with but insulated from each other in a more preferred implementation. At this time the touch control drive lines (i.e., the data lines) TD and the touch control sense lines TS are located at the same layer and of the same material and extend in the same direction; and the touch control gate lines (i.e., the scan lines) TG intersect with but are insulated from both the touch control drive lines (i.e., the data lines) TD and the touch control sense lines TS.

Of course the touch control display panel structured to have touch control coordinates determined by the touch control drive lines (i.e., the data lines) TD and the touch control sense lines TS intersecting with but insulated from each other can also be possible as illustrated in FIG. 20, where the touch control drive lines (i.e., the data lines) TD intersect with but are insulated from the touch control sense lines TS; and the touch control gate lines (i.e., the scan lines) TG and the touch control sense lines TS are insulated from each other and extend in the same direction, and both of them can be located at the same layer.

Similarly to FIG. 17 and FIG. 18, in FIG. 19 and FIG. 20, the gate of the touch control dual-gate TFT 220 and the gate of the switch TFT 210 are connected respectively with different touch control gate lines (i.e., the scan lines TGn and TGn+1); but in fact the gate of the touch control dual-gate TFT 220 and the gate of the switch TFT 210 can be connected with the same touch control gate line (i.e., the scan line TGn or TGn+1).

It shall be noted with respect to an operating process in the third embodiment that the touch control drive signal is the same as the image data signal on the data lines in the third embodiment. When there is a touch control occurring, a touch control dual-gate TFT at the location where the touch control occurs is switched on, and a switch TFT sharing a touch control gate line (i.e., a scan line) with the touch control dual-gate TFT is also switched on; and a data signal on a touch control drive line (i.e., a data line) TD will flow over two paths, where one of the paths has the data signal flowed through the touch control dual-gate TFT and detected, and the other path has the data signal applied to a pixel electrode through the switch TFT. These two paths are parallel, and an image can be displayed normally even for the display panel displaying through a voltage (the data signal is a voltage signal).

Similar to the first embodiment, if the touch control display panel according to the third embodiment of the invention adopts the color film substrate illustrated in FIG. 4, since the first electrically conductive layer 111 includes the plurality of separate first conductive lines 1111, then in order to perform a touch control function, simply at least two of the touch control drive lines (i.e., the data lines), the touch control sense lines, the touch control gate lines (i.e., the scan lines) and the first conductive lines intersect with but are insulated from each other so that touch control coordinates can be determined by the two ones intersecting with but insulated from each other. Preferably touch control coordinates can be determined by the first conductive lines and the touch control gate lines (i.e., the scan lines) intersecting with but insulated from each other.

Moreover the switch TFTs of the pixel elements in the touch control display panel according to the third embodiment of the invention can be the bottom-gate TFTs as illustrated in FIG. 9 or can be the top-gate TFTs as illustrated in FIG. 10. The electrically conductive posts can be arranged in correspondence to the touch control dual-gate TFTs in such a way that the electrically conductive posts are arranged exactly facing to the top gates of the touch control dual-gate TFTs as illustrated in FIG. 9 or that the electrically conductive posts are arranged exactly facing to the bottom gates of the touch control dual-gate TFTs as illustrated in FIG. 10. The color film can also be structured as illustrated in FIG. 12 to FIG. 15. The third embodiment can also adopt the primary posts as illustrated in FIG. 16. As compared with the first embodiment, the remaining structures of the third embodiment of the invention can be common as those in the first embodiment except for the common scan lines and touch control gate lines and the common data lines and touch control drive lines, and reference can be made to the corresponding description in the first embodiment and their drawings for details of those common structures, so a repeated description thereof will be omitted here.

Moreover the touch control display panel according to the third embodiment of the invention can further a scan drive circuit electrically connected with the touch control gate line (i.e., the scan lines), a data drive circuit electrically connected with the touch control drive lines (i.e., the data lines), and a touch control detection circuit electrically connected with the touch control sense lines.

Those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A touch control display panel, comprising:
   a TFT (Thin Film Transistor) array substrate including a plurality of touch control dual-gate TFTs, each having a top gate and a bottom gate, wherein the top gate is insulated from both the bottom gate and a touch control gate line, and the bottom gate is electrically connected with the touch control gate line; and
   a color film substrate arranged in opposition of the TFT array substrate, the color film substrate comprising a plurality of electrically conductive posts on the surface facing the TFT array substrate,
   wherein each of the plurality of electrically conductive posts is arranged in correspondence to one of the plurality of touch control dual-gate TFTs, and
   wherein during a touch action, one of the plurality of electrically conductive posts is not electrically connected with the top gate of the touch control dual-gate TFT, and channel current of the touch control dual-gate TFT is modulated by a capacitive interaction formed between the electrically conductive post and the top gate of the touch control dual-gate TFT.

2. The touch control display panel according to claim 1, wherein the TFT array substrate further comprises a pixel array comprising: a plurality of scan lines; a plurality of data lines intersecting with, but insulated from, the plurality of scan lines; and a plurality of pixel elements, each of which is arranged in a pixel area surrounded by adjacent scan lines and adjacent data lines.

3. The touch control display panel according to claim 2, further comprising a plurality of touch control gate lines, wherein the scan lines and the touch control gate lines are located at the same layer and made of the same material and extend in the same direction; and the data lines are located at the same layer and of the same material and extend in the same direction as a plurality of touch control drive lines and a plurality of touch control sense lines.

4. The touch control display panel according to claim 2, wherein each of the pixel areas is arranged with one of the touch control dual-gate TFTs or a pixel area of a predetermined number of the pixel elements is arranged with one of the touch control dual-gate TFTs.

5. The touch control display panel according to claim 1, wherein the TFT array substrate further comprises a pixel array sharing the plurality of touch control gate lines as scan lines, and wherein the pixel array comprises: a plurality of data lines intersecting with, but insulated from, the plurality of scan lines; and a plurality of pixel elements, each of which is arranged in a pixel area surrounded by adjacent scan lines and adjacent data lines.

6. The touch control display panel according to claim 5, wherein the data lines are located at the same layer and made of the same material and extend in a same direction as the touch control drive lines and the touch control sense lines.

7. The touch control display panel according to claim 1, wherein the TFT array substrate further comprises a pixel array sharing the plurality of touch control gate lines as scan lines and sharing the plurality of touch control drives lines as data lines, and wherein the pixel array comprises a plurality of pixel elements, each of which is arranged in a pixel area surrounded by adjacent scan lines and adjacent data lines.

8. The touch control display panel according to claim 7, wherein the data lines are located at the same layer and made of the same material and extend in the same direction as the touch control sense lines.

9. The touch control display panel according to claim 1, wherein during touch action, the electrically conductive post near the touch is sufficiently close to the top gate of the touch control dual-gate TFT to induce a current of the touch control dual-gate TFT.

10. The touch control display panel according to claim 1, wherein the TFT array substrate further comprises touch control electrodes on a surface layer thereof, which are electrically connected with the bottom gates of the touch control dual-gate TFTs, the top gates of the touch control dual-gate TFTs are electrically connected with the touch control gate lines, and when there is a touch control occurring, the electrically conductive posts are electrically connected with the touch control electrodes.

11. The touch control display panel according to claim 1, wherein the TFT array substrate further comprises touch control electrodes on a surface layer thereof, which are electrically connected with the bottom gates of the touch control dual-gate TFTs, the top gates of the touch control dual-gate TFTs are electrically connected with the touch control gate lines, and when there is a touch control occurring, the free ends of the electrically conductive posts are sufficiently close to the top gates of the touch control dual-gate TFTs to thereby have the currents of the touch control dual-gate TFTs modulated by the electrically conductive posts.

12. The touch control display panel according to claim 1, wherein the color film substrate further comprises a first electrically conductive layer electrically connected with the plurality of electrically conductive posts.

13. The touch control display panel according to claim 12, wherein the first electrically conductive layer is of an integral structure.

14. The touch control display panel according to claim 13, wherein at least two of the touch control drive lines, the touch control sense lines and the touch control gate lines intersect with but are insulated from each other.

15. The touch control display panel according to claim 14, wherein the touch control sense lines and the touch control gate lines intersect with but are insulated from each other and determine coordinates of a touch control location.

16. The touch control display panel according to claim 12, wherein the first electrically conductive layer comprises a plurality of separate first conductive lines, each of which is electrically connected with at least one of the electrically conductive posts.

17. The touch control display panel according to claim 16, wherein at least two of the touch control drive lines, the touch control sense lines, the touch control gate lines and the first conductive lines intersect with, but insulated from, each other.

18. The touch control display panel according to claim 17, wherein the touch control gate lines and the first conductive lines intersect with, but insulated from, each other and determine coordinates of a touch control location.

19. The touch control display panel according to claim 1, wherein each of the plurality of the electrically conductive posts comprises an insulation post body and a second electrically conductive layer on the surface of the insulation post body, and wherein the first electrically conductive layer and the second electrically conductive layer are connected and are located on the same layer and made of the same material.

20. The touch control display panel according to claim 1, wherein the plurality of electrically conductive posts are made of an electrically conductive organic material, and wherein a first electrically conductive layer is an electrically conductive black matrix.

21. The touch control display panel according to claim 20, wherein the color film substrate further comprises an upper substrate and a color-resist layer, and wherein the black matrix is located between the upper substrate and the color-resist layer, or the black matrix is located between the color-resist layer and the plurality of electrically conductive posts.

22. The touch control display panel according to claim 1, wherein the touch control display panel further comprises primary posts, each of which has two ends, and wherein when there is no touch control occurring, both ends of each of the primary posts contact respectively with the TFT array substrate and the color film substrate.

23. The touch control display panel according to claim 22, wherein the length of each of the primary posts is equal to that of each of the electrically conductive posts.

24. The touch control display panel according to claim 22, wherein each of the primary posts comprises a first primary post and a second primary post, and wherein the first primary post transmits an external drive signal from the TFT array substrate to the electrically conductive layer on the color film substrate.

25. The touch control display panel according to claim 24, wherein the touch control display panel further comprises frame sealing glue on the periphery of the touch control display panel to bond the color film substrate and the TFT array substrate together, and the first primary post is located in the frame sealing glue or on a side of the frame sealing glue proximate to a liquid crystal layer or on a side of the frame sealing glue distant from the liquid crystal layer.

* * * * *